US012619249B2

(12) United States Patent  
Ji et al.

(10) Patent No.: US 12,619,249 B2  
(45) Date of Patent: May 5, 2026

(54) SYSTEMS AND METHODS FOR SELECTING A TELEOPERATION CONTROL CENTER FOR A TELEOPERATED DRIVING SESSION

(71) Applicant: Toyota Motor Engineering & Manufacturing North America, Inc., Plano, TX (US)

(72) Inventors: Xunbi Ji, Ann Arbor, MI (US); Sergei S. Avedisov, Redwood City, CA (US); Mohammad Irfan Khan, Sunnyvale, CA (US); Onur Altintas, Sunnyvale, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 189 days.

(21) Appl. No.: 18/535,257

(22) Filed: Dec. 11, 2023

(65) Prior Publication Data

US 2025/0189968 A1　　Jun. 12, 2025

(51) Int. Cl.  
    *G05D 1/227*     (2024.01)  
    *B60W 60/00*     (2020.01)  
(52) U.S. Cl.  
    CPC ......... *G05D 1/2279* (2024.01); *B60W 60/001* (2020.02); *B60W 2556/10* (2020.02); *B60W 2556/45* (2020.02)  
(58) Field of Classification Search  
    None  
    See application file for complete search history.

(56) References Cited

U.S. PATENT DOCUMENTS

| | | | |
|---|---|---|---|
| 9,494,935 | B2 | 11/2016 | Okumura et al. |
| 11,214,265 | B2 | 1/2022 | Magzimof et al. |
| 11,249,473 | B2 | 2/2022 | Shintani et al. |

(Continued)

OTHER PUBLICATIONS

Slamnik-Krijesštorac et al. "Leveraging 5G to Enable Automated Barge Control: 5G-Blueprint Perspectives and Insights", 2023 IEEE 20th Consumer Communications & Networking Conference. 2023.

(Continued)

*Primary Examiner* — Donald J Wallace  
*Assistant Examiner* — Paysun Wu  
(74) *Attorney, Agent, or Firm* — Christopher G. Darrow; Darrow Mustafa PC

(57) ABSTRACT

Systems, methods, and other embodiments described herein relate to selecting a teleoperation control center for a requested teleoperation driving session based on characteristics of the requested teleoperated driving session and a type of control for the session. In one embodiment, a method includes identifying 1) a type of control for a requested teleoperated driving session and 2) a computational parameter for the requested teleoperated driving session based on a session characteristic for the requested teleoperated driving session and the type of control. The method also includes identifying control capabilities of different teleoperation control centers. The method also includes transmitting control of a requesting vehicle to a target teleoperation control center of the different teleoperation control centers based on 1) the computational parameter, 2) the type of control, and 3) the control capabilities of the different teleoperation control centers.

20 Claims, 13 Drawing Sheets

(56)  References Cited

U.S. PATENT DOCUMENTS

| | | | |
|---|---|---|---|
| 11,325,591 B2 | 5/2022 | Kinoshita | |
| 11,397,432 B2 | 7/2022 | Brooks | |
| 11,513,513 B2 | 11/2022 | Jornod et al. | |
| 11,644,830 B1 | 5/2023 | Gate et al. | |
| 11,644,831 B2 | 5/2023 | Patel et al. | |
| 11,651,308 B1 | 5/2023 | Viswanathan et al. | |
| 11,653,222 B2 | 5/2023 | Magzimof et al. | |
| 2020/0282980 A1* | 9/2020 | Kinoshita | G05D 1/0027 |
| 2020/0371516 A1 | 11/2020 | Walossek et al. | |
| 2021/0377707 A1 | 12/2021 | Pfadler et al. | |
| 2022/0075366 A1 | 3/2022 | Blank et al. | |
| 2022/0135067 A1 | 5/2022 | Pfadler et al. | |
| 2024/0036571 A1* | 2/2024 | Goldman | G05D 1/2279 |

OTHER PUBLICATIONS

Baskaran et al. "5G-connected remote-controlled semi-autonomous car trial", 2020 IEEE International Conference on Machine Learning and Applied Network Technologies. 2020.
Kakkavas et al. "Teleoperated support for remote driving over 5G mobile communications", 2022 IEEE International Mediterranean Conference on Communications and Networking. 2022.

* cited by examiner

End-to-End Delay $\tau = 0$ ms

End-to-End Delay $\tau = 800$ ms

SYSTEMS AND METHODS FOR SELECTING A TELEOPERATION CONTROL CENTER FOR A TELEOPERATED DRIVING SESSION

TECHNICAL FIELD

The subject matter described herein relates, in general, to the teleoperated driving of a vehicle and, more particularly, to selecting a teleoperation provider based on characteristics of a requested teleoperated driving session as well as a determined type of control for the requested teleoperated driving session.

BACKGROUND

Teleoperated driving allows a remote operator, which may be a human operator or an autonomous control system, to control the motion of an autonomous or semi-autonomous requesting vehicle without physically being in the requesting vehicle. To accomplish this task, the requesting vehicle that is being remotely driven transmits sensor information such as camera images, LiDAR data, radar data and other environment sensor outputs to the remote operator. The remote operator, whether a human operator or an electronic device-based autonomous control system, processes the sensor information and generates vehicle control commands. The vehicle control commands may be trajectory commands indicating a path for the requesting vehicle to follow for a certain amount of time or commands that directly manipulate the different vehicle systems (e.g., acceleration system, brake system, or steering system) of the requesting vehicle. In the latter case, a human operator workstation may include physical components of the vehicle such as a steering wheel, brake pedal, accelerator pedal, and others. Via activation of these workstation components, the human operator may prescribe vehicle control commands transmitted to and executed by the teleoperated vehicle.

In either case (e.g., trajectory command or direct vehicle system commands), transmission of the vehicle sensor information is referred to as an uplink, and transmission of the vehicle commands is referred to as the downlink. The uplink and downlink may be facilitated via wireless communication between the remote operator workstation and the requesting vehicle.

SUMMARY

In one embodiment, example systems and methods relate to a manner of improving remote teleoperation of a requesting vehicle. In one embodiment, a teleoperation selection system for selecting a teleoperation provider based on the characteristics of a teleoperated driving session and a determined type of control for the teleoperated driving session is disclosed. The teleoperation selection system includes one or more processors and a memory communicably coupled to the one or more processors. The memory stores instructions that, when executed by the one or more processors, cause the one or more processors to identify 1) a type of control for the requested teleoperated driving session and 2) a computational parameter for the requested teleoperated driving session based on a session characteristic for the requested teleoperated driving session and the type of control. The memory also stores instructions that, when executed by the one or more processors, cause the one or more processors to identify control capabilities of different teleoperation control centers and transmit control of a requesting vehicle to a target teleoperation control center of the different teleoperation control centers based on the computational parameter, the type of control, and the control capabilities of the different teleoperation control centers.

In one embodiment, a non-transitory computer-readable medium for selecting a teleoperation provider based on characteristics of a requested teleoperated driving session as well as a determined type of control for the requested teleoperated driving session and including instructions that, when executed by one or more processors, cause the one or more processors to perform one or more functions is disclosed. The instructions include instructions to identify 1) a type of control for the requested teleoperated driving session and 2) a computational parameter for the requested teleoperated driving session based on a session characteristic for the requested teleoperated driving session and the type of control. The instructions also include instructions to identify the control capabilities of different teleoperation control centers. The instructions also include instructions to transmit control of a requesting vehicle to a target teleoperation control center of the different teleoperation control centers based on the computational parameter, the type of control, and the control capabilities of the different teleoperation control centers.

In one embodiment, a method for selecting a teleoperation provider based on the characteristics of a requested teleoperated driving session and a determined type of control for the requested teleoperated driving session is disclosed. In one embodiment, the method includes identifying 1) a type of control for the requested teleoperated driving session and 2) a computational parameter for the requested teleoperated driving session based on a session characteristic for the requested teleoperated driving session and the type of control. The method also includes identifying the control capabilities of different teleoperation control centers. The method also includes transmitting control of a requesting vehicle to a target teleoperation control center of the different teleoperation control centers based on the computational parameter, the type of control, and the control capabilities of the different teleoperation control centers.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
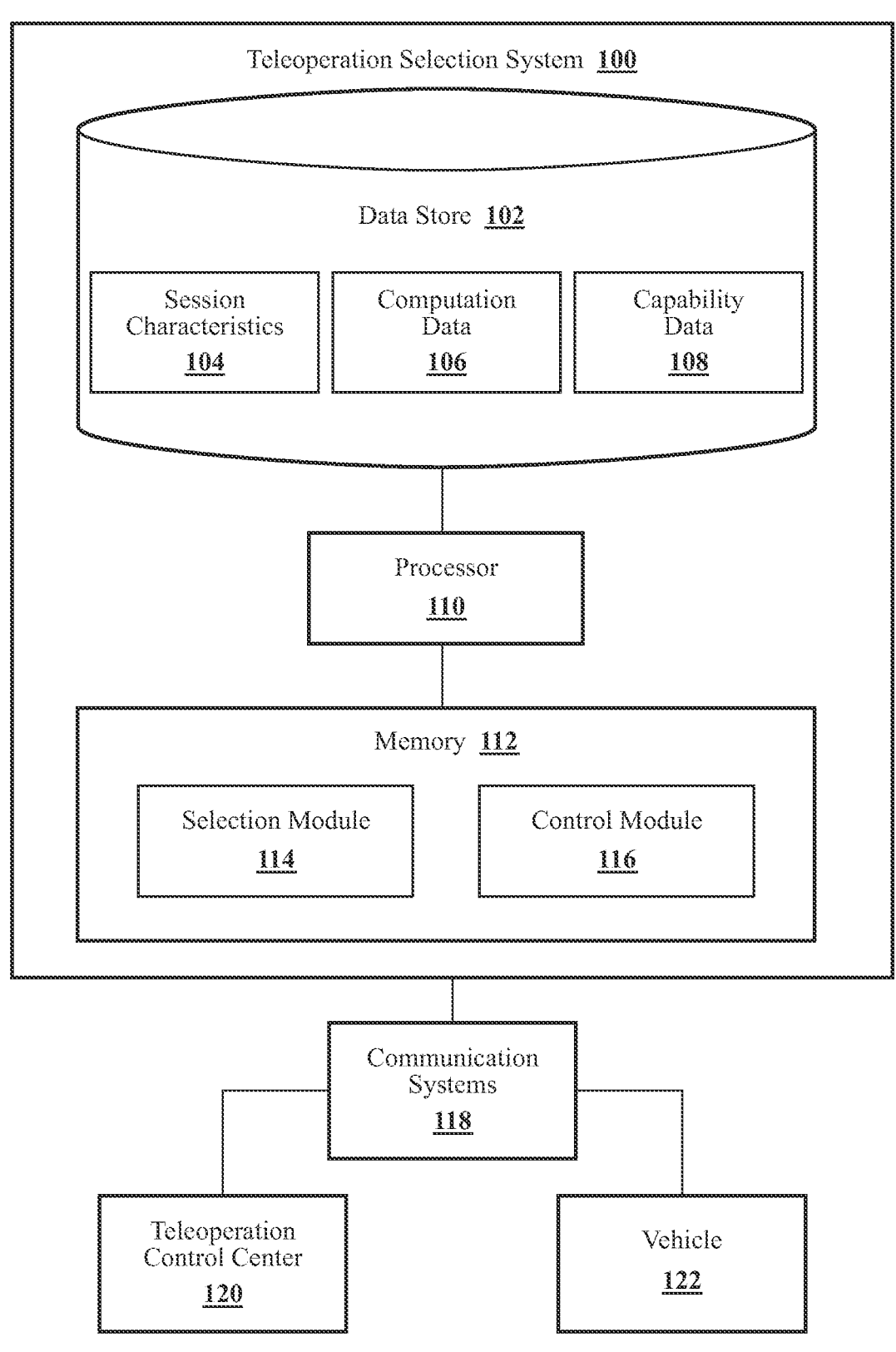
FIG. 1 illustrates one embodiment of a teleoperation selection system that is associated with selecting a teleoperation control center based on teleoperation session characteristics and a type of control.

Systems, methods, and other embodiments associated with improving the teleoperation of autonomous and/or semi-autonomous vehicles are disclosed herein. As previously described, teleoperated driving allows a remote operator, which may be a human operator or an autonomous control system, to control the motion of an autonomous or semi-autonomous requesting vehicle without physically being in the requesting vehicle. Thus, vehicle teleoperation generally involves maneuvering a requesting vehicle along a travel route via a human operator/computing system that is remote from the vehicle with minimal or no input from a human driver in the requesting vehicle.

During vehicle teleoperation, the requesting vehicle transmits sensor information (e.g., camera images, LiDAR data, radar data, and other environment sensor output) to the remote driver via an "uplink." From this information, the remote operator, whether a human operator or an electronic device-based autonomous control system, generates control commands transmitted to the vehicle via a "downlink." The autonomous or semi-autonomous vehicle executes these vehicle control commands to perform a particular maneuver.

Teleoperation systems may be implemented in any number of scenarios. For example, an automobile rental service may include a facility with dozens or even hundreds of vehicles that are frequently moved into, out of, and throughout the facility. In this example, a small group of operators may remotely move any of the hundreds of vehicles from a control center via teleoperation rather than physically being in a vehicle to move such.

While such teleoperation systems provide new, enhanced, and exciting possibilities, the performance of the teleoperated driving system may be constrained by the age of information on the uplink and downlink, which age indicates how frequently sensor data is transmitted to the remote operator on the uplink and how frequently control commands are transmitted to the teleoperated vehicle on the downlink. Transmitting sensor data/commands infrequently may lead to poor performance due to the large age of the information. Transmitting sensor data/commands too frequently may congest the wireless channel, reducing the quality of the teleoperated service.

Teleoperation control center capabilities may also negatively impact the performance of the teleoperated driving session. In any teleoperated driving session, transmitting sensor information to the teleoperation control center and receiving commands from the teleoperation control center take time. Moreover, time is consumed as the remote operator determines the appropriate command and the vehicle acts upon the received commands. In an example, there may be packet loss in the data transmission. Additionally, the configuration of the wirelessly connected teleoperation control centers (e.g., network configuration, teleoperation control algorithms, type of commands provided, quantity of individual teleoperators, etc.) may affect the latency of transmitted information. That is, during teleoperation, any number of session characteristics may give rise to latency or delay between a requested maneuver and the execution of that maneuver.

Characteristics of a requested teleoperated driving session (e.g., vehicle and maneuver characteristics) may call for control center parameters that some teleoperation control centers do not have. That is, there may be an acceptable latency for a given teleoperated driving session, which acceptable latency is determined based on any number of session characteristics. For example, a slow maneuver with longitudinal motion may have a greater acceptable latency compared to a high-speed maneuver with both longitudinal and lateral motion. If a calculated or estimated latency of a particular teleoperation control center is greater than the acceptable latency for the maneuver, this teleoperation control center may not be able to provide teleoperated control or may provide teleoperated control in a way that could be ineffective, inefficient, or unsafe. In other words, it may be the case that not all teleoperation control centers can safely execute every teleoperated maneuver, and attempting to perform a maneuver ill-suited for a teleoperation control center may lead to undesirable results such as a collision with another vehicle and/or injury to an individual.

Accordingly, the teleoperation selection system of the present application optimizes the use of various teleoperation control centers while promoting the performance and safety of the teleoperated driving session. That is, the teleoperation selection system of the present application orchestrates teleoperation sessions based on maneuver complexity.

Specifically, the teleoperation selection system selects teleoperation control centers based on computational parameters for a requested teleoperated driving session calculated from the characteristics of the requested teleoperated driving session. In this example, the teleoperation selection system receives maneuver characteristics (e.g., steering profile for a maneuver, speed profile for a maneuver, maximum allowed deviation of the teleoperated vehicle from a path, and a time criticality of the maneuver), vehicle characteristics (e.g., level of automation, wheelbase, maximum acceleration, minimum acceleration, understeer coefficient, powertrain delay, etc.), and environment characteristics (e.g., objects in the environment, etc.) as input. From this information, the teleoperation selection system identifies a computational parameter (e.g., satisfactory transmission latency and/or operator latency, network configuration, network resources, type of command, processing time, etc.) for the requested teleoperated driving session. The system then matches one of the multiple teleoperation control centers to a particular driving maneuver based on a match between center control capability and the computational parameter and pairs the selected teleoperation control center with the requesting vehicle. That is, the teleoperation selection system receives the input, determines the computational parameters for the teleoperated driving session, and selects a teleoperation control center based on a comparison of the computational parameters with the control capabilities of multiple teleoperation control centers.

In one particular example, the teleoperation selection system selects a target teleoperation control center based on a determined type of command (e.g., trajectory command or direct vehicle system command) and whether a teleoperation control center can provide the type of command requested. For example, it may be that a vehicle or the teleoperation selection system has determined that a direct vehicle system command (as opposed to a trajectory command) is desired for a particular maneuver. In this example, the teleoperation selection system would refrain from assigning this session to a teleoperation control center that is incapable of providing direct vehicle system-level commands.

In this way, the disclosed systems, methods, and other embodiments improve the teleoperation of autonomous or semi-autonomous vehicles. Specifically, the teleoperation selection system allocates teleoperation control resources, which may be finite, amongst requested teleoperated driving sessions in a manner that promotes the acceptable performance of the driving task as well as the efficient use of teleoperation control center resources. That is, the systems, methods, and other embodiments ensure the safety of tele-operated driving sessions by ensuring that appropriately and sufficiently capable teleoperation control centers are assigned to particular teleoperated driving sessions. Moreover, by matching teleoperation control centers to teleoperated driving sessions based on center capability/session parameter matching, the teleoperation selection system ensures that teleoperation resources are not overutilized or underutilized but are optimally allocated according to their determined capability and capacity.

As used herein, a "vehicle" is any form of transport that may be motorized or otherwise powered. In one or more implementations, the vehicle is an automobile. While arrangements will be described herein with respect to automobiles, it will be understood that embodiments are not limited to automobiles. In some implementations, the vehicle may be a robotic device or a form of transport that, for example, is remotely operated and thus benefits from the functionality discussed herein associated with assigning teleoperated control based on teleoperation session characteristics.

Turning now to the figures, FIG. 1 illustrates one embodiment of a teleoperation selection system 100 that is associated with selecting a teleoperation control center 120 based on teleoperation session characteristics and a type of control. In general, the teleoperation selection system 100 is implemented to perform methods and other functions as disclosed herein relating to improving the safety of teleoperated driving sessions and the optimized utilization of teleoperated driving resources.

The teleoperation selection system 100 includes one or more processors 110. In one or more arrangements, the processor(s) 110 can be a primary/centralized processor of the teleoperation selection system 100 or may be representative of many distributed processing units. For instance, the processor(s) 110 can be an electronic control unit (ECU). Alternatively, or additionally, the processors include a central processing unit (CPU), a graphics processing unit (GPU), an application-specific integrated circuit (ASIC), a microcontroller, a system on a chip (SoC), and/or other electronic processing units.

In one embodiment, the teleoperation selection system 100 includes a memory 112 that stores a selection module 114 and a control module 116. The memory 112 is a random-access memory (RAM), read-only memory (ROM), a hard-disk drive, a flash memory, or another suitable memory for storing the modules 114 and 116. The modules 114 and 116 are, for example, computer-readable instructions that, when executed by the processor 110, cause the processor 110 to perform the various functions disclosed herein. In alternative arrangements, the modules 114 and 116 are independent elements from the memory 112 that are, for example, comprised of hardware elements. Thus, the modules 114 and 116 are alternatively ASICs, hardware-based controllers, a composition of logic gates, or another hardware-based solution.

Moreover, in one embodiment, the teleoperation selection system 100 includes the data store 102. The data store 102 can be comprised of volatile and/or non-volatile memory. Examples of memory that may form the data store 102 include RAM, flash memory, ROM, PROM (Programmable Read-Only Memory), EPROM (Erasable Programmable Read-Only Memory), EEPROM (Electrically Erasable Programmable Read-Only Memory), registers, magnetic disks, optical disks, hard drives, solid-state drives (SSDs), and/or other non-transitory electronic storage medium. In one configuration, the data store 102 is a component of the processor(s) 110. In general, the data store 102 is operatively connected to the processor(s) 110 for use thereby. The term "operatively connected," as used throughout this description, can include direct or indirect connections, including connections without direct physical contact.

The data store 102 is, in one embodiment, configured with routines that can be executed by the processor 110 for analyzing stored data, providing stored data, organizing stored data, and so on. Thus, in one embodiment, the data store 102 stores data used by the modules 114 and 116 in executing various functions. In one embodiment, the data store 102 stores session characteristics 104, computation data 106, and capability data 108 along with, for example, metadata that characterizes various aspects of the session characteristics 104, computation data 106, and capability data 108. For example, the metadata can include location coordinates (e.g., longitude and latitude), relative map coordinates or tile identifiers, time/date stamps, and identifiers of the session/vehicle associated with the session characteristics 104, computation data 106, and capability data 108.

In general, the session characteristics 104 include information that indicates characteristics of the environment in which a teleoperated driving session will be executed. As described above, the characteristics of the teleoperated driving session dictate the computational resources and parameters that will result in the safe execution of tasks during a teleoperated driving session. For example, a low-speed driving maneuver with little lateral variation may be safely performed by a teleoperation control center 120 with an estimated latency of 800 milliseconds. In contrast, a higher-speed driving maneuver with more lateral variation may call for a teleoperation control center 120 with an estimated latency of 400 milliseconds or less. The session characteristics 104 of the data store 102 include those characteristics by which a computational parameter for the requested teleoperated driving session is identified.

The session characteristics 104 may include maneuver characteristics. Maneuver characteristics are the characteristics of the particular maneuver to be executed. Example maneuver characteristics include a speed profile for the maneuver, a steering profile for the maneuver, an allowed deviation along a path of the maneuver, a time criticality of the maneuver, a path maximum velocity, and a path curvature, among others. Each of these maneuver characteristics may prescribe particular computational parameters. For example, a maneuver with higher speed, more steering, less allowed deviation along the path, a higher priority, and a higher maximum velocity may result in a lower allowable latency as compared to a maneuver with lower speed, less steering, more allowed deviation along the path, a lower priority, and a lower maximum velocity. In an example, the maneuver characteristics may be received via the communication system 118 from the vehicle 122 requesting teleoperated control or calculated by the selection module 114 (based on navigational input such as the current location of the vehicle 122 and the final destination of the vehicle 122 received from the vehicle 122 requesting teleoperated control). While particular reference is made to particular maneuver characteristics, other maneuver characteristics may be implemented in accordance with the principles described herein.

The session characteristics 104 may also include vehicle characteristics. Vehicle characteristics refer to those characteristics of the vehicle 122 that may impact the vehicle's ability to execute requested commands. Example vehicle characteristics include a level of automation of the vehicle 122, a steering ratio for the vehicle 122 (i.e., a ratio between the steering column and the wheels of the vehicle 122), an understeer coefficient of the vehicle 122, a powertrain delay of the vehicle 122 (i.e., constant(s) describing internal powertrain dynamics), a coefficient of longitudinal and lateral friction of the tires of the vehicle 122, vehicle dynamics, vehicle latency, type of vehicle 122, a wheelbase of the vehicle 122, a maximum acceleration for the vehicle 122, and a minimum acceleration for the vehicle 122, among others. For example, a vehicle 122 that is capable of autonomous operation based on a received trajectory command but not based on direct vehicle system commands (e.g., commands to the acceleration, brake, and steering systems of the vehicle 122) may dictate control by a teleoperation control center 120 that is capable of sending trajectory commands. As such, teleoperation by a control center that issues direct vehicle system commands may be ineffective. As another example, a vehicle 122 that has a greater powertrain delay and that is slower to respond to received commands may call for a connection with lower latency to offset the delay brought on by this particular vehicle characteristic. In an example, the vehicle characteristics may be received via the communication system 118, from a remote database, or a database of the vehicle 122 requesting teleoperated control. While particular reference is made to particular vehicle characteristics, other vehicle characteristics may be implemented in accordance with the principles described herein.

The session characteristics 104 may include environment characteristics. That is, the environment where the requesting vehicle 122 is found may call for certain parameters for the requested teleoperated driving session. For example, the movement of a teleoperated vehicle 122 in a full parking garage may trigger a tighter allowed deviation from a suggested path and a slower speed profile for the vehicle 122 as opposed to the movement of a teleoperated vehicle 122 in an empty or partially empty parking garage.

In an example, the environment characteristics may be received from environment sensors on the vehicle 122 or environment sensors in the region surrounding the vehicle 122. That is, the vehicle 122 and surrounding infrastructure may include a sensor system. The sensor system can include one or more sensors. Various examples of different types of sensors will be described herein. However, it will be understood that the embodiments are not limited to the particular sensors described. The sensor system may include one or more environment sensors that sense a surrounding environment (e.g., external) of the vehicle. For example, the one or more environment sensors sense objects in the surrounding environment of the vehicle 122. Such obstacles may be stationary objects and/or dynamic objects. As an example, in one or more arrangements, the sensor system includes one or more radar sensors, one or more LiDAR sensors, one or more sonar sensors (e.g., ultrasonic sensors), and/or one or more cameras (e.g., monocular, stereoscopic, RGB, infrared, etc.). Additional details regarding the use of session characteristics to determine a particular computational parameter for the teleoperated driving session are provided below in connection with FIG. 2.

The data store 102 also includes computation data 106, which represents the data by which computational parameters are identified based on session characteristics for the teleoperated driving session. As described above, the characteristics of the session dictate certain connection parameters, remote operation parameters, and network configuration parameters to ensure the teleoperated driving session is executed safely and as intended. The computation data 106 facilitates the calculation of the computational parameters based on received session characteristics 104.

In an example, the computation data 106 includes simulation models and/or results. That is, in an example the computational parameters are determined based on teleoperated driving session simulations. That is, the selection module 114 may simulate a particular teleoperated driving session under different conditions (e.g., latencies, network configurations, control formats, etc.) and determine under which set of conditions the teleoperated driving session may be performed satisfactorily (i.e., safely and/or meeting certain criteria). Example simulations are depicted below in FIGS. 6A-6D. In this example, the computation data 106 includes the simulation models, results, etc., whether performed in real-time during the teleoperated driving session or in advance of the teleoperated driving session, from which the computational parameters are determined.

In an example, the computation data 106 includes historical data. In this example, the selection of computational parameters is based on an analysis of previously executed teleoperated driving sessions. That is, the computation data 106 may include a log of previously executed teleoperated driving sessions, including the session characteristics, computed computational parameters, and outcomes of the teleoperated session. The log may be a lookup table such that for a presently requested teleoperation session, the selection module 114 may identify the computational parameters that have historically been used for sessions having similar characteristics to the present session.

In another example, the computational parameters are identified via a machine-learning system that identifies patterns and/or deviations based on previously unseen data. In the context of the present application, a machine-learning teleoperation selection system 100 relies on some form of machine learning, whether supervised, unsupervised, reinforcement, or any other type, to infer computational parameters based on the session characteristics 104. In this case, the computation data 106 includes the weights (including trainable and non-trainable), biases, variables, offset values, algorithms, parameters, and other elements that operate to output computational parameters based on the session characteristics. While particular reference is made to particular computation data 106, other computation data 106 may be implemented in accordance with the principles described herein. Additional details regarding the calculation of computational parameters based on session characteristics 104 are provided below in connection with FIG. 2.

The data store 102 further includes capability data 108 that indicates the control capability of the different teleoperation control centers 120. As described above, if a teleoperation control center 120 has insufficient control and transmission capabilities to manage a particular teleoperated driving session, the performance of the session may suffer and be unsafe. As such, the capability data 108 indicates the capabilities of the different teleoperation control centers 120 such that a teleoperation control center 120 may be given control over a particular teleoperated driving session for which it has sufficient resources to manage safely. Examples of teleoperation control center 120 capabilities include network characteristics (e.g., expected transmission latency, network configuration, distance from a requesting vehicle 122 and/or base station) and remote operation characteristics (e.g., type of commands generated, type of operator, type of control algorithm, operator latency, number of operators, and processing time). While particular reference is made to particular capability data 108, other capability data 108 may be implemented in accordance with the principles described herein.

In an example, the capability data 108 is received via the communication system 118 from the various teleoperation control centers 120 that are in communication with the teleoperation selection system 100. In some examples, the capability data 108 may change over time. For example, human operators may become unavailable/available in a teleoperation control center 120 as different teleoperated driving sessions are initiated and terminated. Moreover, processor-based teleoperation workstations may update the algorithm by which they control a teleoperated vehicle. In these and other circumstances, the capabilities of a given teleoperation control center 120 may change. The capability data 108 may be updated to include accurate, precise, and up-to-date information. Additional details regarding the selection of a teleoperation control center 120 based on capability data 108 are provided below in connection with FIG. 2.

The teleoperation selection system 100 further includes various modules 114 and 116. In at least one arrangement, the modules 114 and 116 are implemented as non-transitory computer-readable instructions that, when executed by the processor 110, implement one or more of the various functions described herein. In various arrangements, one or more of the modules 114 and 116 are a component of the processor(s) 110, or one or more of the modules 114 and 116 are executed on and/or distributed among other processing systems to which the processor(s) 110 is operatively connected. Alternatively, or in addition, the one or more modules 114 and 116 are implemented, at least partially, within hardware. For example, the one or more modules 114 and 116 may be comprised of a combination of logic gates (e.g., metal-oxide-semiconductor field-effect transistors (MOSFETs)) arranged to achieve the described functions, an ASIC, programmable logic array (PLA), field-programmable gate array (FPGA), and/or another electronic hardware-based implementation to implement the described functions. Further, in one or more arrangements, one or more of the modules 114 and 116 can be distributed among a plurality of the modules 114 and 116 described herein. In one or more arrangements, two or more of the modules 114 and 116 described herein can be combined into a single module.

The selection module 114, in one embodiment, includes instructions that cause the processor 110 to identify 1) a type of control for the requested teleoperated driving session and 2) a computational parameter for the requested teleoperated driving session based on a session characteristic for the requested teleoperated driving session and the type of control. As described above, different teleoperated driving sessions have different characteristics which may call for certain computational arrangements such that the teleoperated driving session is executed with a threshold performance level and that is safe. The selection module 114 receives as input the session characteristics 104, which session characteristics 104 may include maneuver characteristics, vehicle characteristics, and environment characteristics. The selection module 114 also receives a type of control (e.g., trajectory control or direct vehicle system control) for the teleoperated driving session. As described below in connection with FIG. 2, the determination of the type of control may be based on any number of factors, such as the autonomous control capabilities of the vehicle 122.

As described above, in an example the selection module 114 implements and/or otherwise uses a machine learning algorithm. A machine-learning algorithm generally identifies patterns and deviations based on previously unseen data. In the context of the present application, a machine-learning selection module 114 relies on some form of machine learning, whether supervised, unsupervised, reinforcement, or any other type of machine learning, to identify computational parameters for a teleoperated driving session based on the received session characteristics 104.

In one configuration, the machine learning algorithm is embedded within the selection module 114, such as a convolutional neural network (CNN) or an artificial neural network (ANN), to perform computational parameter identification over the session characteristics 104. Of course, in further aspects, the selection module 114 may employ different machine learning algorithms or implement different approaches for performing the computational parameter identification, which can include logistic regression, a naïve Bayes algorithm, a decision tree, a linear regression algorithm, a k-nearest neighbor algorithm, a random forest algorithm, a boosting algorithm, and a hierarchical clustering algorithm among others to generate computational parameters. Other examples of machine learning algorithms include, but are not limited to, deep neural networks (DNN), including transformer networks, convolutional neural networks, recurrent neural networks (RNN), Support Vector Machines (SVM), clustering algorithms, Hidden Markov Models, and so on. It should be appreciated that the separate forms of machine learning algorithms may have distinct applications, such as agent modeling, machine perception, and so on. In one particular example, the machine-learning selection module 114 may be a neural network that includes any number of 1) input nodes that receive session characteristics 104, 2) hidden nodes, which may be arranged in layers connected to input nodes and/or other hidden nodes and which include computational instructions for computing outputs, and 3) output nodes connected to the hidden nodes which generate an output indicative of the computational parameters for the teleoperated driving session.

It should be appreciated that machine learning algorithms are generally trained to perform a defined task. Thus, the training of the machine learning algorithm is understood to be distinct from the general use of the machine learning algorithm unless otherwise stated. That is, the selection module 114 or another system generally trains the machine learning algorithm according to a particular training approach, which may include supervised training, self-supervised training, reinforcement learning, and so on. In contrast to training/learning of the machine learning algorithm, the selection module 114 implements the machine learning algorithm to perform inference. Thus, the general use of the machine learning algorithm is described as inference.

Whichever particular approach the selection module 114 implements, the selection module 114 provides an output with computational parameters for the teleoperated driving session based on the session characteristics 104. In this way, the selection module 114 ensures that each teleoperated driving session is managed by a teleoperation control center 120 that is technologically aligned with the session characteristics.

The selection module 114, in one embodiment, includes instructions that cause the processor 110 to identify the control capabilities of the set of teleoperation control centers 120. That is, as described above, different teleoperation control centers 120 have different capabilities and, as such, some may be ill-suited to manage certain teleoperated driving sessions. For example, a teleoperation control center 120 that has a high estimated system latency and that is incapable of transmitting direct vehicle system (e.g., acceleration, braking, steering) commands may be ill-suited, or even incapable, of controlling a vehicle 122 requesting direct vehicle system control commands for a high-speed maneuver with significant route curvature. As such, using any number of modalities such as simulation, historical records, or machine learning, the selection module 114 pairs a particular teleoperation control center 120 with a requested teleoperation driving session based on a match/alignment of 1) the calculated computational parameters and requested control type for a particular teleoperated driving session and 2) the control capabilities of a teleoperation control center 120. Additional details regarding the operations of the selection module 114 are provided below in connection with FIG. 2.

The control module 116, in one embodiment, includes instructions that cause the processor 110 to transmit control of a requesting vehicle 122 to a target teleoperation control center 120 of the different teleoperation control centers 120 based on the computational parameter, the type of control, and the control capabilities of the different teleoperation control centers 120. As such, the control module 116 is communicatively coupled to the selection module 114 to receive an indication of a paired teleoperation control center 120. Based on this output, the control module 116, via the communication system 118, establishes a data transmission path with the selected teleoperation control center 120 and instructs such to establish a remote and wireless connection with a requesting vehicle 122. In some examples, the control module 116 may broker the connection by providing both the requesting vehicle 122 and the teleoperation control center 120 with identifying information of the other and/or identifying information of the session (e.g., a session identifier) such that the selected teleoperation control center 120 and the requesting vehicle 122 may establish a wireless teleoperation communication channel.

As such, the teleoperation selection system 100 functions in cooperation with a communication system 118. In one embodiment, the communication system 118 communicates according to one or more communication standards. For example, the communication system 118 can include multiple different antennas/transceivers and/or other hardware elements for communicating at different frequencies and according to respective protocols. The communication system 118, in one arrangement, communicates via a communication protocol, such as a WiFi or another suitable protocol for communicating between the vehicle 122 and various teleoperation control centers 120. Moreover, the communication system 118, in one arrangement, further communicates according to a protocol, such as global system for mobile communication (GSM), Enhanced Data Rates for GSM Evolution (EDGE), Long-Term Evolution (LTE), 5G, or another communication technology that provides for the teleoperation selection system 100 communicating with various vehicles 122, local agents, and teleoperation control centers 120. In any case, the teleoperation selection system

100 can leverage various wireless communication technologies to provide communications to other entities. Via this communication system 118, session characteristics 104, computation data 106, and capability data 108 may be received and updated. Also via this communication system 118, communication paths may be brokered between the teleoperation control centers 120 and vehicles 122 and associated instructions regarding a pairing between such may be transmitted to the respective teleoperation control centers 120 and vehicles 122.

Figure 2:
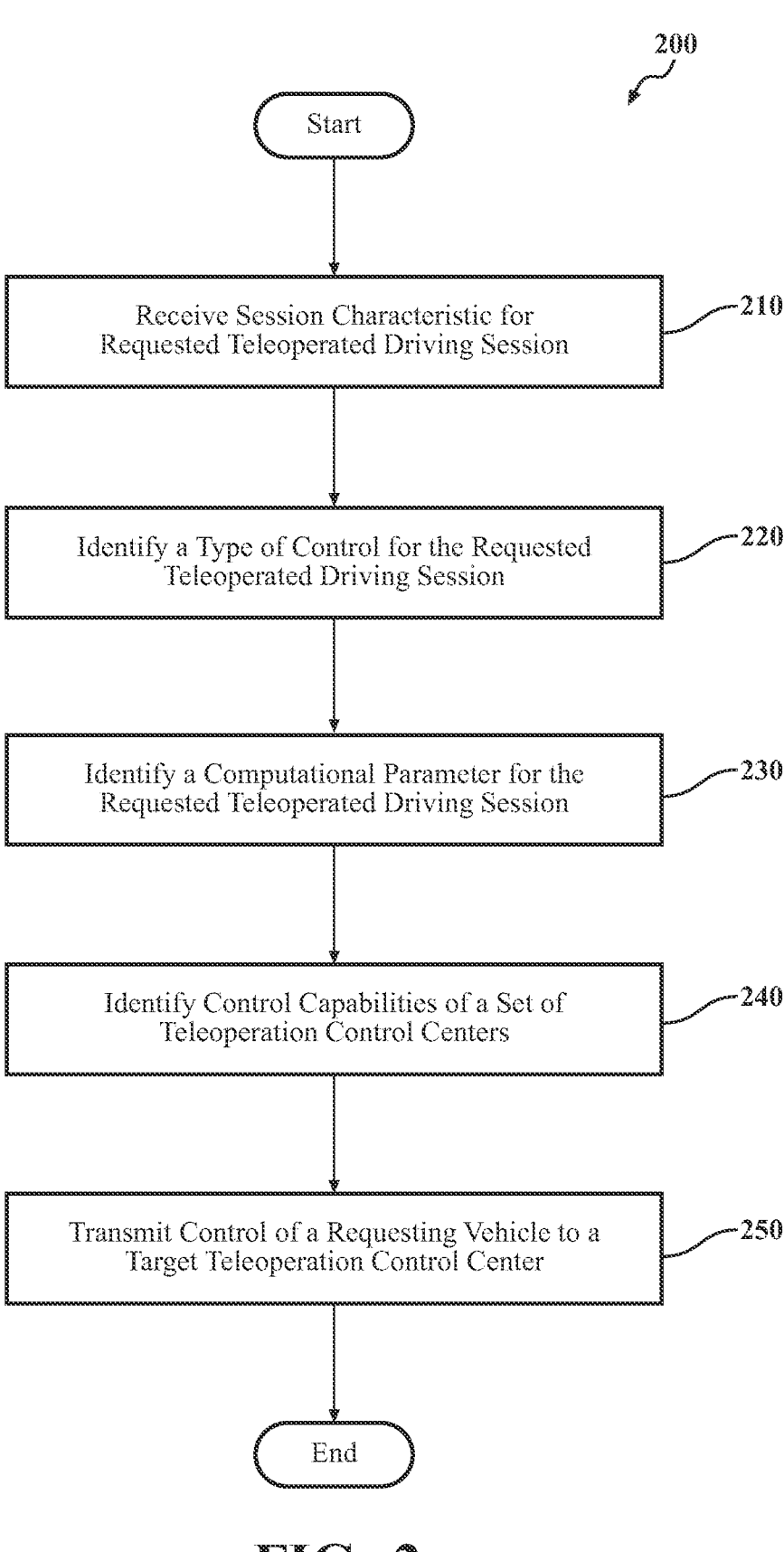
FIG. 2 illustrates a flowchart for one embodiment of a method that is associated with selecting a teleoperation control center based on teleoperation session characteristics and a type of control.

Additional aspects of selecting teleoperation control centers 120 based on teleoperate driving session characteristics will be discussed in relation to FIG. 2. FIG. 2 illustrates a flowchart of a method 200 that is associated with identifying characteristics of a teleoperated driving session and selecting a teleoperation control center 120 for the session based on those characteristics. Method 200 will be discussed from the perspective of the teleoperation selection system 100 of FIG. 1. While method 200 is discussed in combination with the teleoperation selection system 100, it should be appreciated that the method 200 is not limited to being implemented within the teleoperation selection system 100 but is instead one example of a system that may implement the method 200.

At step 210, the selection module 114 receives session characteristic(s) for a requested teleoperated driving session. As described above, certain aspects of the teleoperated driving session call for the allocation of specific computational resources to ensure safe and satisfactory performance. As such, the selection module 114 receives the session characteristics to determine the computational parameters.

As described above, the session characteristics may include maneuver characteristics such as a path for the maneuver, a speed profile for the maneuver, a steering profile for the maneuver, an allowed deviation along a path of the maneuver, a time criticality of the maneuver, a path maximum velocity, whether it is a longitudinal or lateral maneuver, and a path curvature for the maneuver, among others. In an example, the maneuver characteristics may be received or calculated by a vehicle 122 requesting teleoperated control or by the selection module 114. In another example, the maneuver characteristics may be received from an on-site agent managing the requesting vehicle 122 and other vehicles. For example, a local agent at a parking garage may manage a fleet of autonomous or semi-autonomous vehicles. In this example, the local agent may transmit the maneuver characteristics to the teleoperation selection system 100.

As described above, the session characteristics may include vehicle characteristics such as a level of automation of the vehicle 122, a steering ratio for the vehicle 122, an understeer coefficient of the vehicle 122, a powertrain delay of the vehicle 122, a coefficient of longitudinal and lateral friction of the tires of the vehicle 122, vehicle dynamics, vehicle latency, type of vehicle 122, a wheelbase of the vehicle 122, a maximum acceleration for the vehicle 122, and a minimum acceleration for the vehicle 122, among others. The vehicle characteristics may be received from the requesting vehicle 122, from the local agent that manages the requesting vehicle 122, or from a remote database that includes vehicle characteristics of multiple vehicles.

The session characteristics 104 may include environment characteristics such as identified objects (such as vehicles or other stationary objects and dynamic objects) in the environment of the vehicle 122. In an example, the environment characteristics may be received from environment sensors on the vehicle 122 or environment sensors in the region surrounding the vehicle 122.

At 220, the selection module 114 identifies a type of control for the requested teleoperated driving session. Specifically, the selection module 114 includes instructions that cause the processor 110 to identify the type of control as a trajectory control or a direct vehicle system control. As described above, the type of control may be based on the autonomous capability of the vehicle 122. That is, some vehicles may be capable of operating based on trajectory-based commands, direct vehicle system commands, or a combination thereof. As such, the selection module 114 may identify which type of control should be used for a particular session based on whether a requesting vehicle 122 can respond to such a command.

Still further, the selection of the type of control may be based on latency-based considerations. That is, as described above, direct vehicle system controls may involve greater latencies. As such, the selection module 114 may select a particular type of control based on whether or not a particular session can accommodate greater latencies.

At 230, the selection module 114 identifies a computational parameter for a requested teleoperated driving session based on a session characteristic for the requested teleoperated driving session and the type of control. Specifically, the selection module 114 identifies the computational parameter based on at least one of a maneuver characteristic, a vehicle characteristic, or an environment characteristic. That is, these different characteristics may call for specific computational parameters to ensure a threshold level of safety and/or performance during the teleoperated driving session. A few examples are now provided.

An example maneuver characteristic that may define a computational parameter is the allowed deviation along a path of the maneuver, which may be referred to as the desired precision of the movement. For example, in a parking garage full of vehicles, greater precision may be desired to avoid collisions with other vehicles in the parking garage. Maneuvers with a higher precision characteristic may call for reduced latency, as increased latency may lead to more imprecise vehicle movements, as depicted in FIGS. 6A-6D.

In addition to maneuver characteristics, certain vehicle characteristics may dictate the computational parameters that should be implemented in any given teleoperated driving session. One specific example is the level of automation of the vehicle 122. That is, as described above, there are various levels of autonomous control, and certain vehicles may be able to operate at different levels. Of particular relevance, some vehicles may be able to autonomously operate given trajectory commands, such as following a predetermined path for a predetermined amount of time. An example trajectory command is to follow a particular path for some time. Other vehicles may be unable to operate autonomously on trajectory commands, but may be able to operate via direct vehicle system commands, such as commands that target the acceleration, brake, or steering systems of the vehicle. An example of direct vehicle system command may be to steer at 20 degrees while applying 50% throttle for a period of time.

In general, direct vehicle system commands may have more inherent latency than trajectory commands. Accordingly, to ensure the teleoperated task is performed under an overall threshold latency, the selection module 114 may select a teleoperation control center 120 with lower latency to execute a direct vehicle system command. In contrast, a larger teleoperation control center latency may be permissible if the vehicle 122 is capable of trajectory-based commands.

Another specific example is a powertrain delay of the vehicle 122, which corresponds to how receptive the vehicle 122 is to a received command. That is, the vehicle 122 may have a specific latency in engaging the powertrain to execute a command to accelerate. If an estimated latency for a teleoperation control center 120 is too large, the estimated center latency plus the inherent powertrain latency/delay may result in an unsafe teleoperated driving session or a driving session that is outside of the bounds defined for the teleoperated driving session.

Another example is the understeer coefficient of the vehicle 122, which defines how stable the vehicle 122 is when performing turns and encompasses such vehicle features as the dimensions of the vehicle 122, the weight of the vehicle 122, the wheelbase of the vehicle 122, and the stiffness of the tires. As an example, a vehicle with a highly negative understeer coefficient may be more prone to spinning out or departing from a path and hitting an object on the side of the path, such as a curb, as compared to a vehicle with a lower understeer coefficient. As such, a teleoperation control center with a relatively higher estimated latency may result in vehicle spin-out as the vehicle could not stably follow an evasive maneuver, for example.

Another example is a vehicle type, for example whether the vehicle 122 is an internal combustion-based vehicle or an electric vehicle. An internal combustion vehicle, for example, exhibits an inherent latency in providing the right amount of fuel and air to the engine and activating the gearbox logic to carry out a particular maneuver. By comparison, if the vehicle 122 is electric, the control system is simpler and has a shorter latency. As such, the vehicle type may define a computational parameter to ensure an overall latency does not pass some predetermined threshold. While particular examples are provided of how different session characteristics affect the selection of a computational parameter, other session characteristics may similarly be considered when determining a computational parameter.

Based on the received session characteristics 104 and the type of control, the selection module 114 identifies a computational parameter. As described above, a computational parameter is a parameter, setting, attribute, or configuration for a teleoperation control center 120 that ensures the teleoperated driving session meets certain performance and/or safety standards. In an example, the identified computer parameter is a network parameter or a remote operation parameter. That is, certain network configurations and remote operation configurations may be particularly suited for a particular teleoperated driving session. For example, certain server configurations (e.g., cloud-based servers or edge servers) may be particularly suited for a particular teleoperated driving session. As a specific example, for a teleoperated driving session where low latency is desired, a cloud-based server may have an associated latency that could result in the overall latency for the teleoperated driving session being such that the vehicle 122 cannot respond to commands in sufficient time as to ensure the safety and adequate performance of a particular maneuver. By comparison, an edge server may have a lower associated inherency than the cloud-based server, such that the vehicle 122 may be controlled safely.

By comparison, for a simpler maneuver, such as moving the vehicle 122 in just a longitudinal direction at low speeds, the cloud-based server latency may still allow for satisfactory and safe execution of the teleoperated maneuver. Were an edge server utilized in this simple maneuver, it would be underutilized and unavailable for a more complicated maneuver where its particular control capabilities would be more fully utilized. As such, the selection module 114 ensures a more complete utilization of the teleoperation control center capabilities.

Other example network parameters that may be identified by the selection module 114 based on the session characteristics include an allowable transmission latency, uplink and downlink transmission rates, resources at the teleoperation control center allocated for the session, network configuration, and a distance of the teleoperation control center to the vehicle and/or a transmission base station, which may affect the reliability and strength of a wireless channel.

Similarly, the teleoperated driving session may prescribe certain remote operation parameters. As one specific example, the selection module 114 may select a type of command (i.e., trajectory command or direct vehicle system command). As described above, these different command types may have different latencies associated with them. Specifically, direct vehicle system commands may have a higher latency than trajectory commands. Accordingly, based on the session characteristics and the vehicle capabilities, a particular type of command may be desired for a particular session. Again, where the teleoperated driving session includes simple maneuvers, it may be that the latency associated with direct vehicle system commands still allows for the execution of the maneuver. Trajectory-type commands may be called for if the maneuver has a higher complexity.

Other examples of remote operation parameters that may be identified for a particular teleoperated driving session based on characteristics of the session include a type of operator (e.g., human operator or autonomous system operator), a type of control algorithm, operator latency (e.g., human operator latency or autonomous system execution latency), and processing time. While particular reference is made to particular computational parameters identified for a particular teleoperated driving session, the selection module 114 may determine other computational parameters or combinations of these and other computational parameters for a given teleoperated driving session.

As described, the computational parameter may be determined in various ways. For example, the selection module 114 may include an instruction that causes the processor 110 to run simulations of the requested teleoperated driving session, with each simulation having different candidate computational parameters and types of control. In this example, the selection module 114 may refer to models defined in the computation data 106 that replicate the vehicle dynamics. As one particular example, the movement of vehicles may be modeled using a bicycle model that replicates vehicle motion and steering and, more specifically, vehicle longitudinal and lateral dynamics. The selection module 114 uses this model and the session characteristics 104 with different conditions (e.g., various network configurations, estimated latencies, control algorithms, types of operators, types of remote command, etc.) to determine under what conditions the teleoperated driving maneuver can be successfully completed. In an example, the simulations may be performed in real-time after the session characteristics 104 have been received, and before starting the maneuver.

In another example, the determination of the computational parameter may be done using stored information about prior teleoperated maneuvers that were performed. That is, the selection module 114 may include an instruction that causes the processor 110 to identify as the computational parameter of the current session, historical computational parameters from historical teleoperated driving sessions with the same session characteristic as the session characteristic of the requested teleoperated driving session. For example, the computation data 106 may include logs of previously executed teleoperated driving maneuvers and the conditions (e.g., various network configurations, estimated latencies, control algorithms, types of operators, types of remote command, etc.) of the previously executed teleoperated driving maneuvers as well as the outcome (e.g., successful, failed, etc.) of the session. In this example, upon receipt of the session characteristics 104, the selection module 114 may compare the session characteristics 104 for the current session with the session characteristics of the previously completed sessions to identify similarities. The selection module 114 may then set as the computational parameter, the computational parameters of previously performed sessions that have session characteristics that match session characteristics of the current session.

In an example, rather than basing a determination of the computational parameter on previously executed teleoperated driving sessions, the selection module 114 may base a determination of the computational parameter on previously simulated sessions. That is, similar to the example where the computation data 106 includes datasets of previously executed teleoperated driving sessions, in this example, the computation data 106 may include a dataset of previously simulated sessions with the computational parameter being selected based on a match between session characteristics of a requested session and those of a previously simulated session.

In another example, the selection module 114 may be a machine-learning system that determines the computational parameters based on machine-learning analysis (whether supervised based on a training set, unsupervised, or reinforcement-learning) of the session characteristics. In any case, the selection module 114 identifies the particular computational parameters for the requested teleoperated driving session.

At 240, the selection module 114 identifies the control capabilities of the set of teleoperation control centers 120. As described above, specific teleoperation control centers 120 may be ill-equipped to handle certain teleoperated driving sessions. Moreover, other teleoperation control centers 120 may be underutilized if assigned to handle certain types of teleoperated driving sessions. Accordingly, the selection module 114 receives the control capabilities of teleoperation control centers 120 to utilize the pool of teleoperation control center capabilities more efficiently.

The control capabilities may be of various types. For example, the selection module 114 may identify at least one of a network characteristic or a remote operation characteristic for each of the set of teleoperation control centers 120. Examples of network characteristics that may be identified by the selection module 114 include but are not limited to, expected transmission latency, network configuration (e.g., cloud server, edge server, etc.), resources at the teleoperation control center 120, and a distance of the teleoperation control center 120 to the vehicle 122 and/or a transmission base station (e.g., gNodeB). For example, different network configurations, in addition to being of different types (e.g., cloud server vs. edge server), may have different multiplexing levels, which may introduce delays in the operation of any associated teleoperation control center 120.

Similarly, each teleoperation control center 120 may have certain remote operation characteristics that may impact the teleoperation control center's ability to provide teleoperated control safely and satisfactorily. Examples of remote operation characteristics that may be identified by the selection module 114 include, but are not limited to, a type of teleoperation control (e.g., trajectory control and direct vehicle system control) offered, type of operator (e.g., human operator or autonomous system operator), a type of control algorithm, operator latency (e.g., human operator latency, or autonomous system execution latency), and processing time. While particular reference is made to particular control capabilities identified for a particular teleoperation control center 120, the selection module 114 may identify other control capabilities or combinations of these and other control capabilities for a given teleoperation control center.

A few specific examples of remote operation characteristics and their impact on control center/session matching will be provided. As a first example, a teleoperation control center 120 may employ human operators or non-human autonomous operators. In either case, operator latency may weigh whether a particular teleoperation control center is selected. Historical data may be collected for each human operator indicating past performance, such as response times and correct/safe teleoperated control. For certain teleoperated driving maneuvers (e.g., time-critical maneuvers with complex movements), human operators with a quicker response may be prioritized over less experienced operators. As another example, an autonomous, non-human operator may also be monitored for response times and may also have a specification indicating a processing time for determining a desired teleoperation command.

As another example, non-human operators operate based on a particular control algorithm. For example, a non-human operator may use a pure pursuit algorithm to control the lateral movement of the vehicle 122, while another non-human operator may implement a more complex algorithm, such as a curvature-based algorithm. In this example, the curvature-based algorithm may be more complex but results in more accurate vehicle control. In this case, the control algorithm may be considered when selecting one of multiple teleoperation control centers 120 to be assigned to a particular teleoperated driving session.

As described above, the control capability for a teleoperation control center 120 may vary over time for several reasons, including the availability/unavailability of individual operators in a multi-workstation center as tasks are requested and completed, updates to workstation systems, etc. As such, the selection module 114 may periodically poll the teleoperation control centers 120 such that the resource pool, and respective control capabilities, are updated in real time whenever a resource is assigned to a session and released from a session when a task is completed.

At 250, the teleoperation selection system 100 transmits control of a requesting vehicle 122 to a target teleoperation control center 120 of the set of teleoperation control centers based on the computational parameter, the type of control, and the control capabilities of the set of teleoperation control centers 120.

Specifically, the selection module 114 pairs teleoperation control centers 120 to teleoperated driving sessions based on a match between the computational parameter, type of control, and the control capabilities of the different teleoperation control centers 120, and the control module 116 transmits a signal to the target teleoperation control center 120 and vehicle 122 to initiate a teleoperated driving session.

The selection and transmission of control to a target teleoperation control center 120 may occur in various ways.

In one example, the control module 116 sequentially transmits a control request to teleoperation control centers 120 of the different teleoperation control centers. In this example, a first teleoperation control center 120 determines whether its control capabilities satisfy the computational parameter. If not, the request is passed to a subsequent teleoperation control center 120. In this example, the control module 116 selects, as the target teleoperation control center 120, the first teleoperation control center 120 that indicates its control capability aligns with the computational parameter.

In another example, the control module 116 compares the control capabilities of the different teleoperation control centers 120 with the computational parameter and selects one of the teleoperation control centers 120 whose control capability aligns with the computational parameter as the target teleoperation control center 120. In some examples, if multiple teleoperation control centers 120 have control capability that aligns with the computational parameter, the control module 116 may select any, or the highest performing, teleoperation control center 120 for the teleoperated driving session. For example, each teleoperation control center 120 may be ranked based on past performance. As such, the control module 116 may select the highest-ranked available teleoperation control center 120 to control a particular teleoperated driving session. While particular reference is made to a particular selection criterion (e.g., rank) of aligned teleoperation control centers 120, other criteria may be used to select one of multiple aligned teleoperation control centers 120.

In either case, once a teleoperation control center 120 is selected, the control module 116, via the communication system 118 brokers, establishes, and/or initiates a wireless communication link between the target teleoperation control center 120 and a requesting vehicle 122. For example, the control module 116 may transmit identifying information for either entity to the other entity and instruct the teleoperation control center 120 to initiate a handshake operation whereby a teleoperated driving session is initiated.

Various additional actions may be performed at the target teleoperation control center 120. For example, the target teleoperation control center 120 may select a teleoperator from a pool of remote teleoperators for the teleoperated driving session. For example, the target teleoperation control center 120 may determine if other remote operation tasks are being performed. If not, the highest available uplink and downlink with the shortest processing time may be used to optimize the performance of the teleoperated driving session. If other tasks are being performed, the target teleoperation control center 120 may determine the priority of the current teleoperated driving session compared to other tasks and select an operator based on the priority of the current teleoperated driving session and others, all while satisfying the computational parameters for each of the teleoperated driving sessions.

As such, the present teleoperation selection system 100 promotes safety and increases the performance of teleoperated driving sessions by ensuring that particular teleoperated driving sessions are assigned to teleoperation control centers 120 that are sufficiently equipped to handle such. Moreover, the teleoperation selection system 100 promotes the greater utility of teleoperation control resources, prevents underutilization and overutilization of teleoperation control centers 120 and enhances the efficiency of teleoperated control of autonomous or semi-autonomous vehicles.

Figure 3:
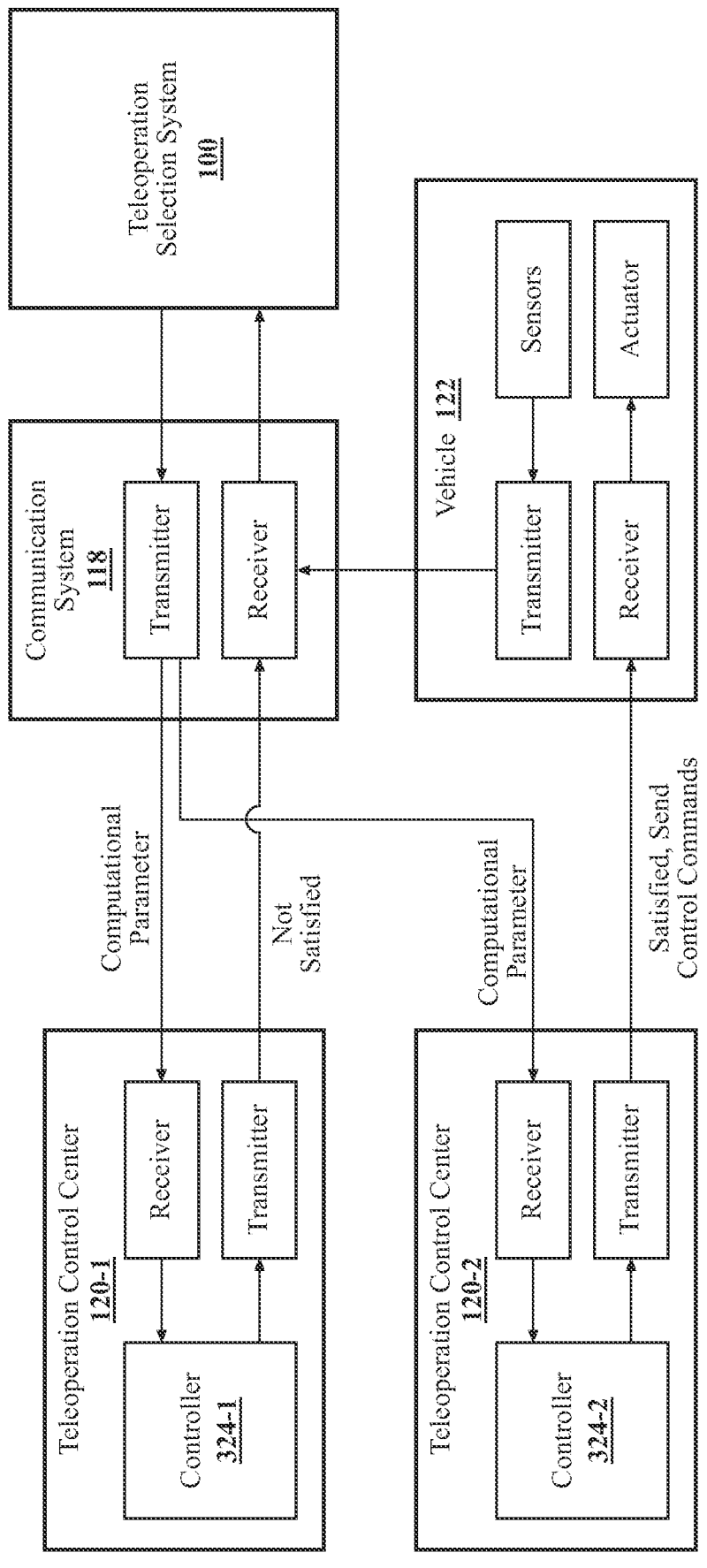
FIG. 3 illustrates one embodiment of an environment wherein a teleoperation selection system selects a teleoperation control center based on teleoperation session characteristics and a type of control.

FIG. 3 illustrates one embodiment of an environment wherein a teleoperation selection system 100 selects a teleoperation control center 120 based on teleoperation session characteristics and a type of control. Specifically, FIG. 3 depicts a scenario where control requests are sequentially sent to different teleoperation control centers 120-1 and 120-2. As described above, a vehicle 122 may include a variety of sensors that collect information about the vehicle 122, which information may include one or more of vehicle characteristics, maneuver characteristics, and environment characteristics. Via a transmitter of the vehicle 122 and a receiver of the communication system 118, the teleoperation selection system 100 acquires this information. The teleoperation selection system 100 also has other session characteristics 104 received from other sources or calculated by the selection module 114. The teleoperation selection system 100 may then calculate the computational parameters, including a maximum end-to-end latency allowed, for the teleoperated driving session requested by the vehicle 122. The transmitter of the communication system 118 then transmits the computational parameter to a first teleoperation control center 120-1. In this example, a controller 324-1 of the first teleoperation control center 120-1 may determine that its control capability does not align with or satisfy the transmitted computational parameters and may notify the teleoperation selection system 100 of such. As such, the transmitter of the communication system 118 then transmits the computational parameters to a second teleoperation control center 120-2. In this example, a controller 324-2 of the second teleoperation control center 120-2 may determine that its control capability aligns with and satisfies the transmitted computational parameter. In this example, the teleoperation selection system 100 authorizes, and/or establishes, a wireless communication link between the second teleoperation control center 120-2 and the vehicle 122 to effectuate teleoperated control of the vehicle 122 by the second teleoperation control center 120-2.

FIGS. 4A-4D depict the selection of a teleoperation control center 120 based on teleoperation session characteristics and a type of control. As described above, teleoperated driving may be used in a variety of scenarios. In one example, as depicted in FIGS. 4A-4D, teleoperated driving may be implemented in a parking garage where multiple vehicles are moved in and out of the garage and within the garage to different locations. As described above, in some examples, a request to initiate a teleoperated driving session may come directly from a vehicle 122. In the example depicted in FIGS. 4A-4D, the request originates from a local agent 426 near the vehicle 122. The operations described above may be implemented in either case.

In the example depicted in FIGS. 4A-4D, a customer may be renting the vehicle 122 such that the vehicle 122 is to be transported from its parking spot to a loading zone. In this example, the teleoperation selection system 100 may select from three teleoperation control centers 120-1, 120-2, and 120-3 to perform the maneuver. Note that while FIGS. 4A-4D depict three teleoperation control centers 120-1, 120-2, and 120-3, the teleoperation selection system 100 may interface with and select from any number of teleoperation control centers 120. In this example, a first teleoperation control center 120-1 supports trajectory control, while second and third teleoperation control centers 120-2 and 120-3 send direct vehicle low-level commands such as velocity and steering commands. Each teleoperation control center 120-1, 120-2, and 120-3 may employ different operators (e.g., different control algorithms and processing times) and network configurations such that each has a different end-to-end latency. Note that while the example of FIGS. 4A-4D depict a few control capabilities and computational parameters, any number or combination of the above-referenced control capabilities and computational parameters may be processed when selecting a particular teleoperation control center 120 for the session.

Figure 4A:
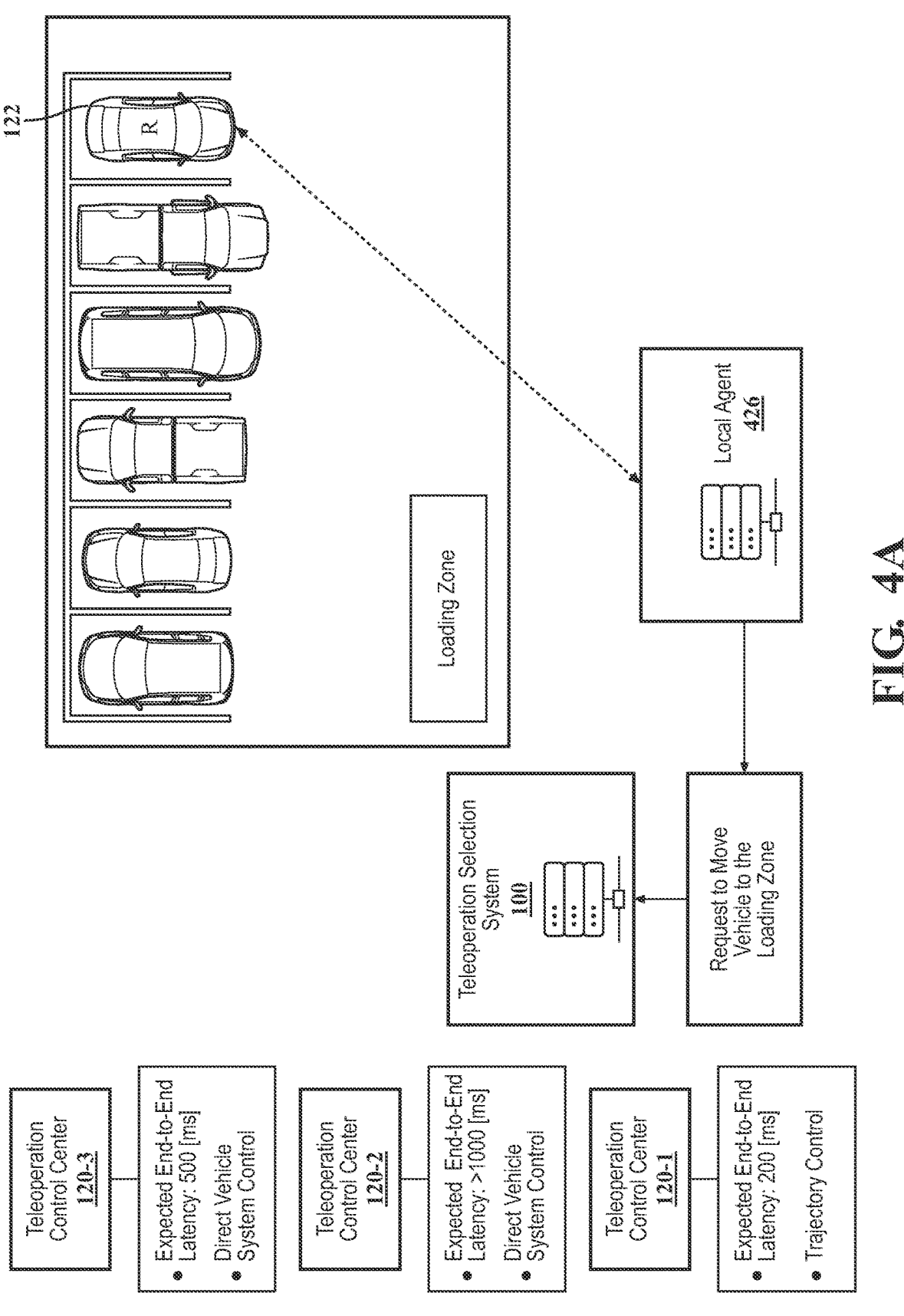
FIGS. 4A-4D depict the selection of a teleoperation control center based on teleoperation session characteristics and a type of control.

As depicted in FIG. 4A, the local agent 426 transmits a request to the teleoperation selection system 100 to teleoperate the vehicle 122 from the parking spot to the loading zone. The local agent 426 may also transmit session characteristics such as vehicle characteristics and maneuver characteristics.

Figure 4B:
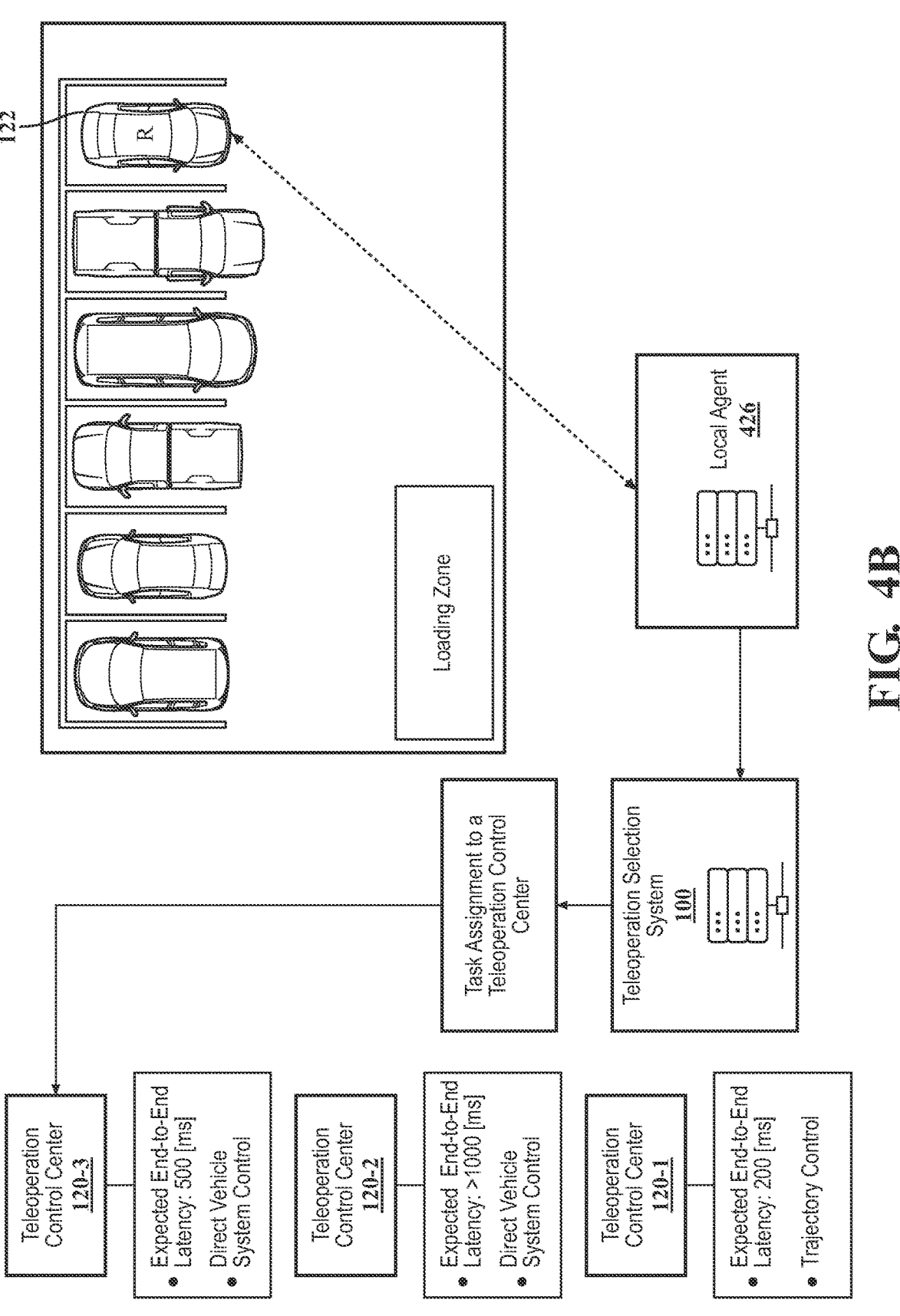

As described above, the teleoperation selection system 100 calculates a computational parameter (e.g., a latency parameter) based on the session characteristics and checks with each teleoperation control center 120 whether they can comply with the computational parameter. For example, the session may dictate direct vehicle system control commands instead of trajectory commands because the vehicle 122 may not have a high enough automation level to follow a suggested path. This may call for a selected teleoperation control center 120 that can perform direct vehicle system controls. Furthermore, based on the maneuver characteristic indicating a speed of around 2 meters per second (m/s) in the parking lot and other session characteristics, the teleoperation selection system 100 may identify a latency parameter for the session of below 600 milliseconds (ms). Thus, as depicted in FIG. 4B, the teleoperation selection system 100 may select the third teleoperation control center 120-3 to perform the task. While the first teleoperation control center 120-1 has a lower latency, it is not chosen as it cannot send direct vehicle system commands. While the second teleoperation control center 120-2 can provide direct vehicle system commands, it is not chosen due to its above threshold expected latency.

Figure 4C:
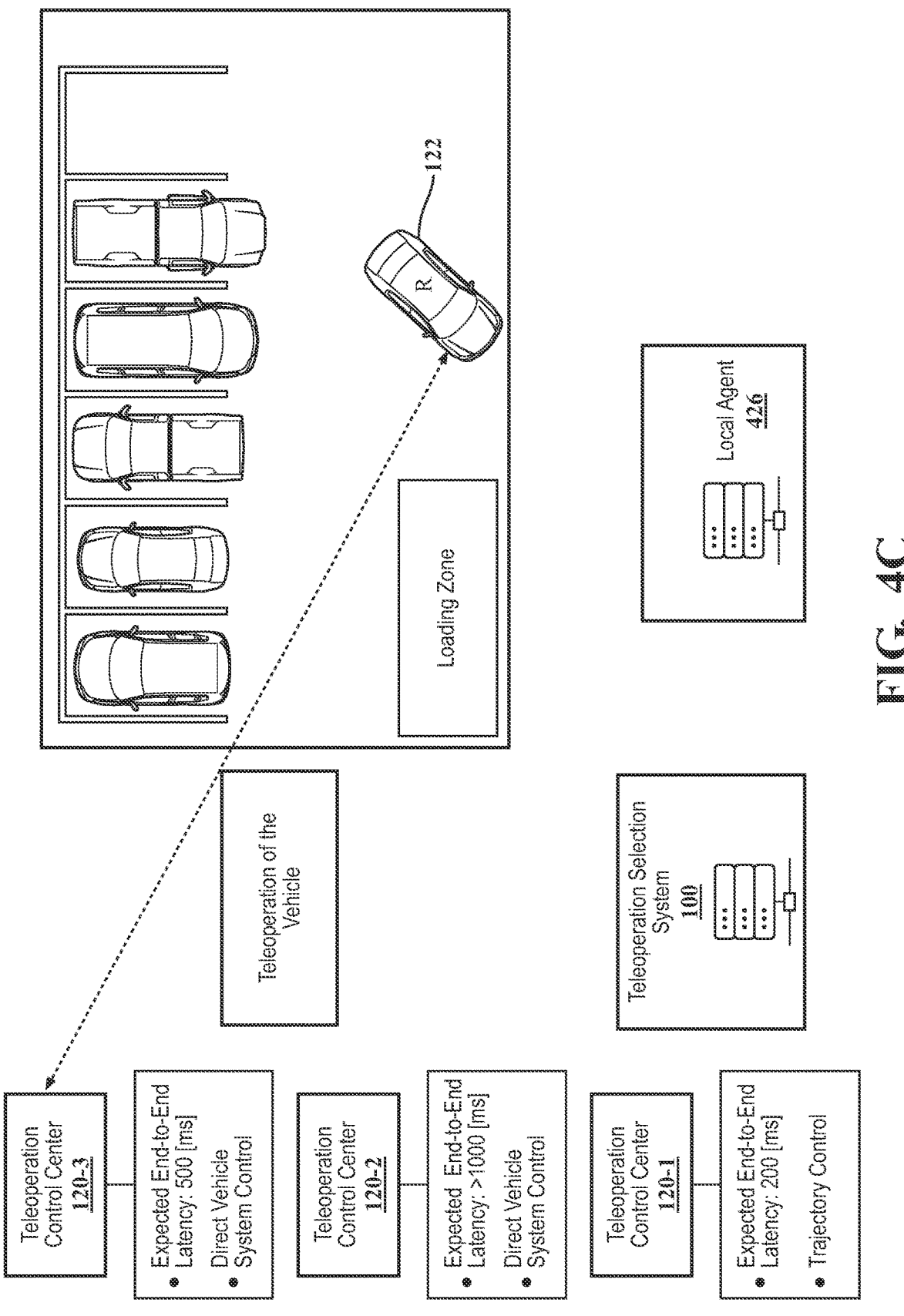

As depicted in FIG. 4C, the teleoperation selection system 100 brokers a teleoperation communication channel between the third teleoperation control center 120-3 and the vehicle 122 such that the vehicle 122 is teleoperated by the third teleoperation control center 120-3. During teleoperation, the vehicle 122 transmits camera data to the third teleoperation control center 120-3 and receives the trajectory update.

Figure 4D:
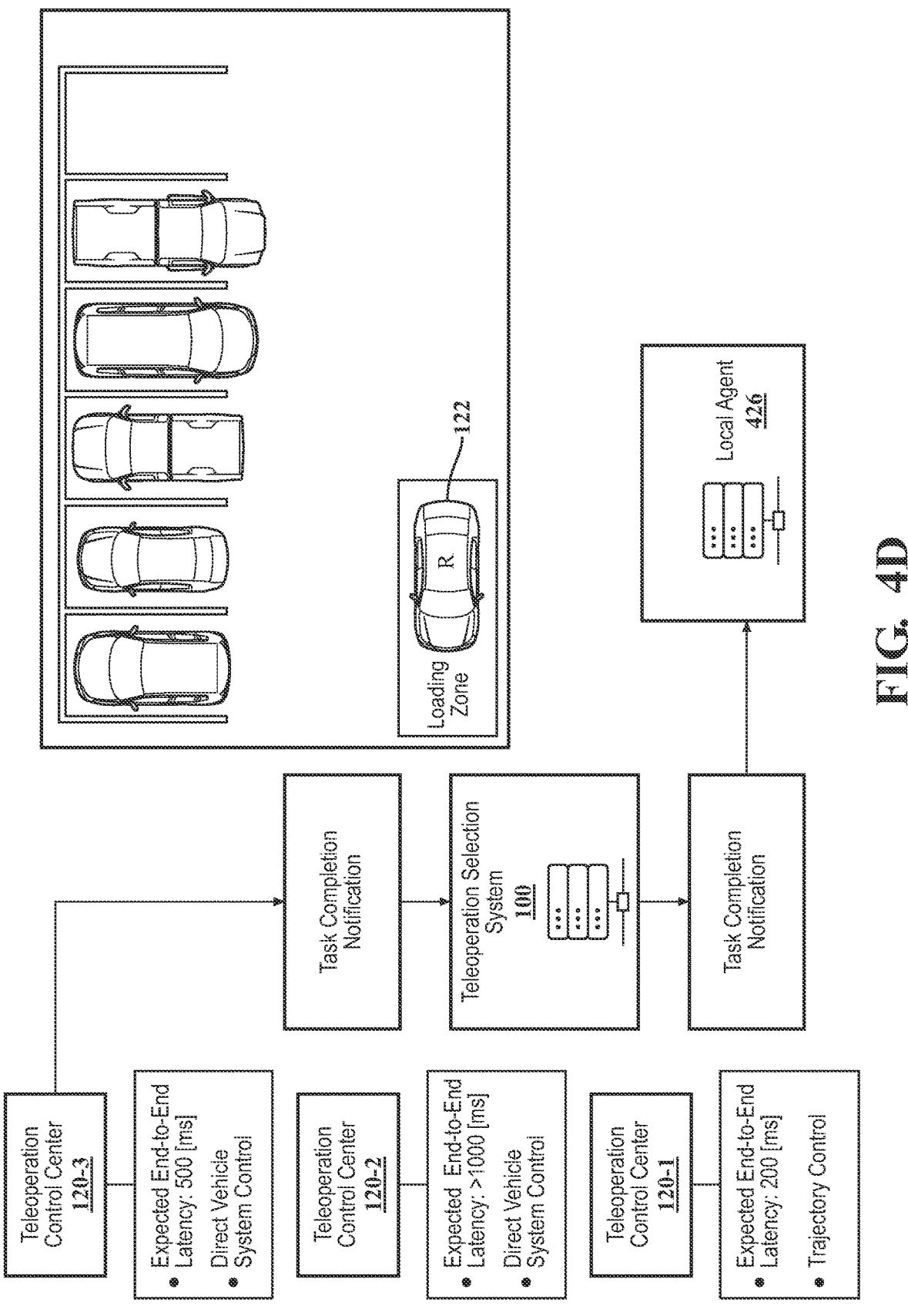

As depicted in FIG. 4D, the third teleoperation control center 120-3 finishes the maneuver and notifies the teleoperation selection system 100 of such. As such, the third teleoperation control center 120-3 may re-enter the pool of centers available for other subsequent teleoperated driving sessions. The local agent 426 receives the notification from the teleoperation selection system 100 and notifies the customer that their vehicle 122 is ready and waiting in the loading zone.

FIGS. 5A-5D depict the selection of a teleoperation control center 120 based on teleoperation session characteristics and a type of control. In the example depicted in FIGS. 5A-5D, a first vehicle 122-1 occupies a reserved spot (e.g., an electric vehicle (EV) charging station), and a second vehicle 122-2 enters the parking garage and requests to occupy the reserved spot. In this example, the parking lot is full. Accordingly, the first vehicle 122-1 is to be transported to the loading zone in a second lot across a street. In this example, traveling along the street between the lots may include speeds of up to 15 m/s. In this example, the first vehicle 122-1 may have an automation level that allows it to follow a given trajectory or execute direct vehicle system commands.

Figure 5A:
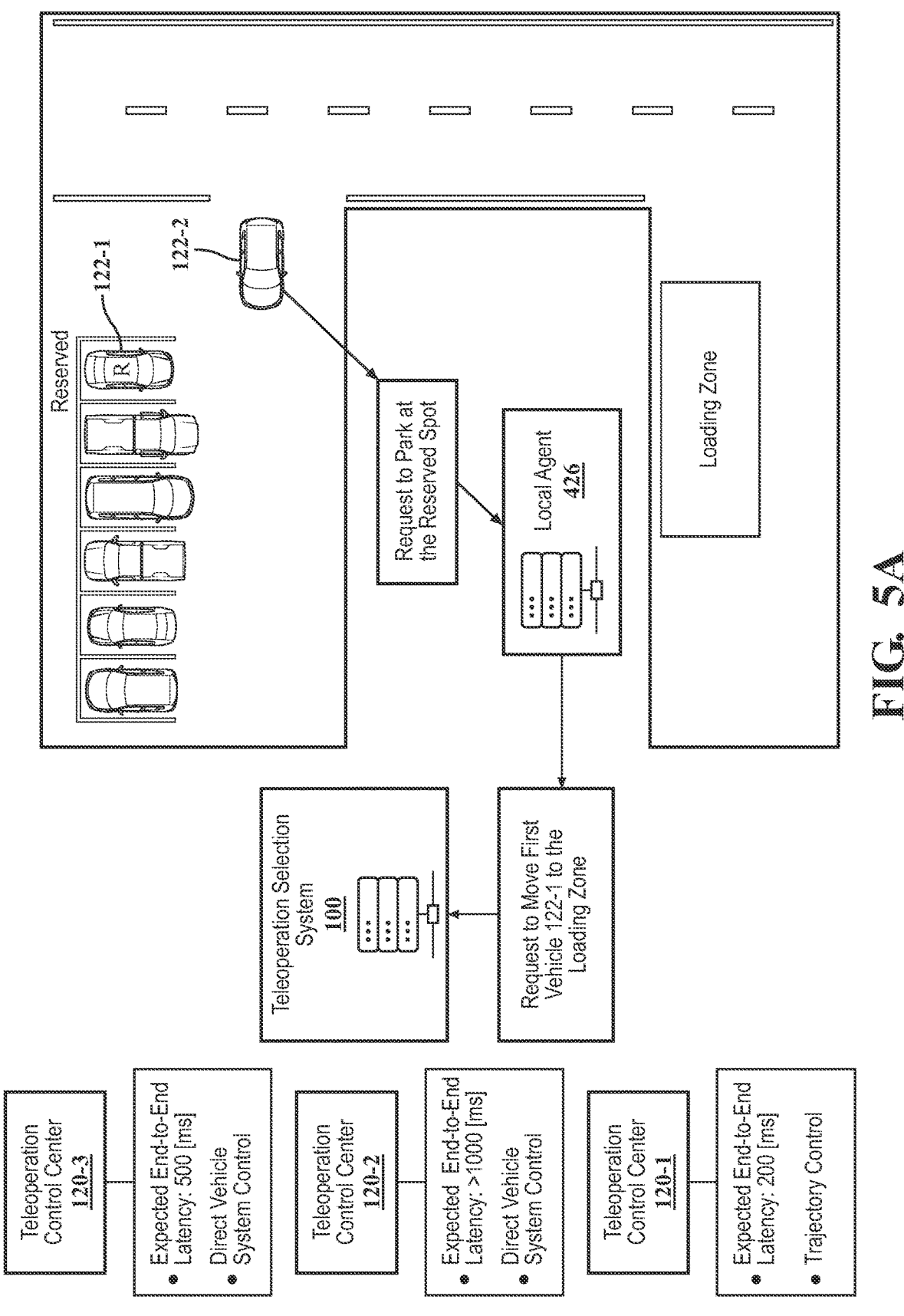
FIGS. 5A-5D depict the selection of a teleoperation control center based on teleoperation session characteristics and a type of control.

As depicted in FIG. 5A, the second vehicle 122-2 transmits a request to the local agent 426 to park at the reserved spot. The local agent 426 then requests to move the first vehicle 122-1 across the street to the loading zone. As in the previous example, the local agent 426 may also transmit session characteristics such as vehicle characteristics, and maneuver characteristics.

Figure 5B:
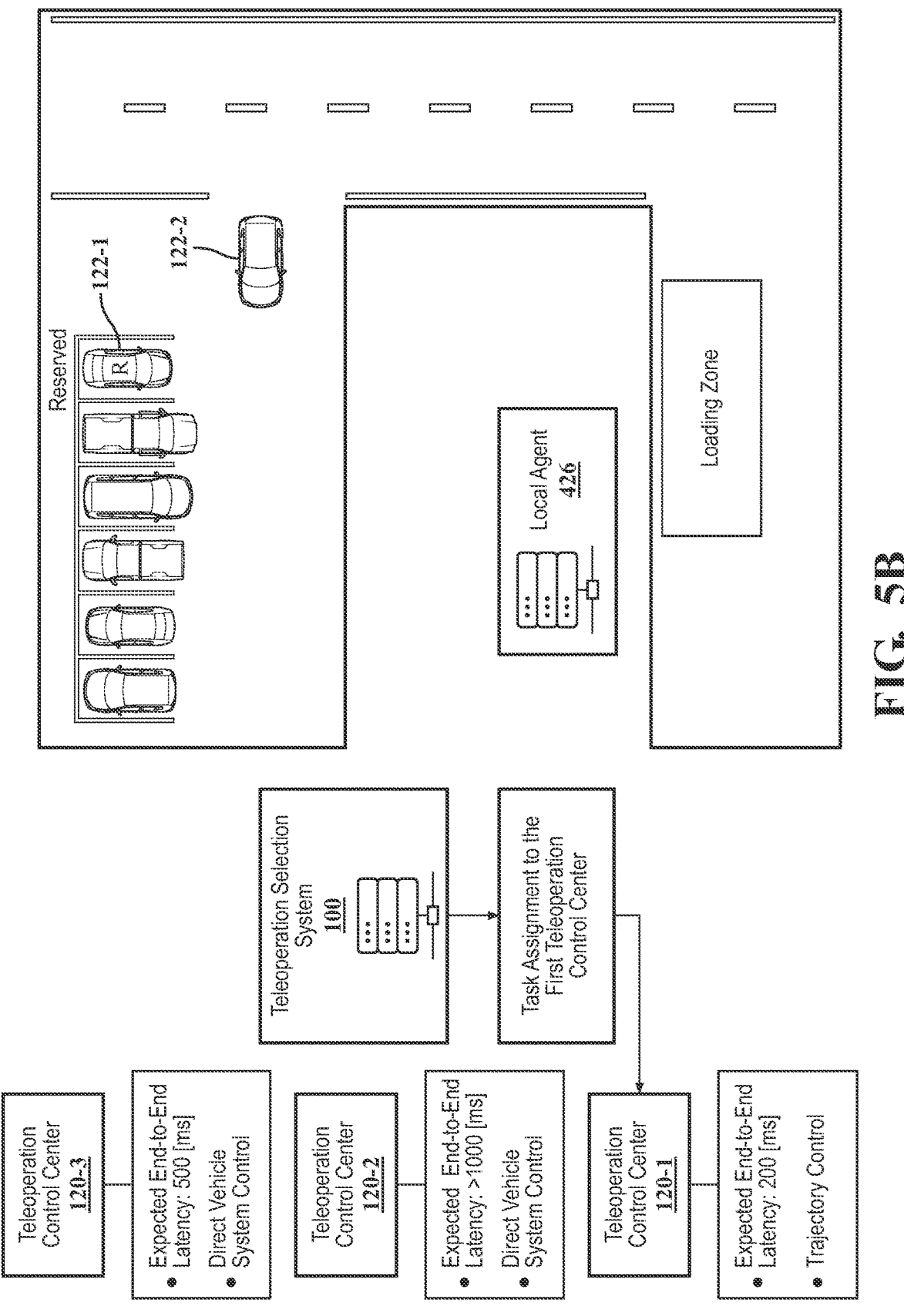

As described above, the teleoperation selection system 100 calculates a computational parameter (e.g., a latency parameter) based on the session characteristics and checks the suitability of each teleoperation control center 120. In this case, the speed requirement on the street is 15 (m/s), which may call for a lower end-to-end latency than the example depicted in FIGS. 4A-4D. Furthermore, given the autonomous capability of the first vehicle 122-1, the teleoperation selection system 100 may identify a latency prerequisite of below 300 ms for sending trajectory controls or 50 ms for sending direct vehicle system control commands. Thus, as depicted in FIG. 5B, the teleoperation selection system 100 may select the first teleoperation control center 120-1, which has an estimated latency of 200 ms, to teleoperate the first vehicle 122-1.

Figure 5C:
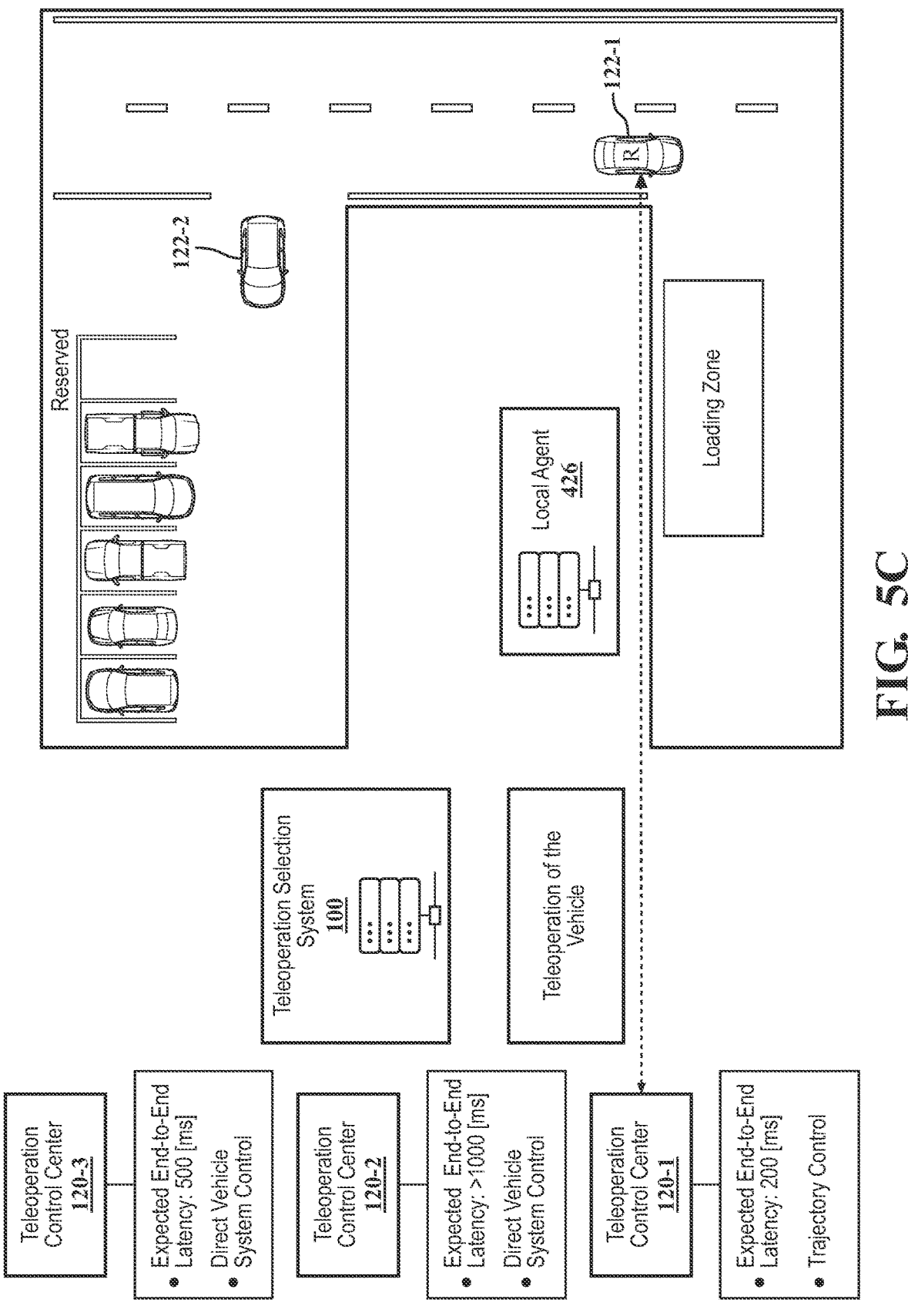

As depicted in FIG. 5C, the teleoperation selection system 100 brokers a teleoperation communication channel between the first teleoperation control center 120-1 and the first vehicle 122-1 such that the first vehicle 122-1 is teleoperated by the first teleoperation control center 120-1. During teleoperation, the first vehicle 122-1 transmits camera data to the first teleoperation control center 120-1 and receives the trajectory update.

Figure 5D:
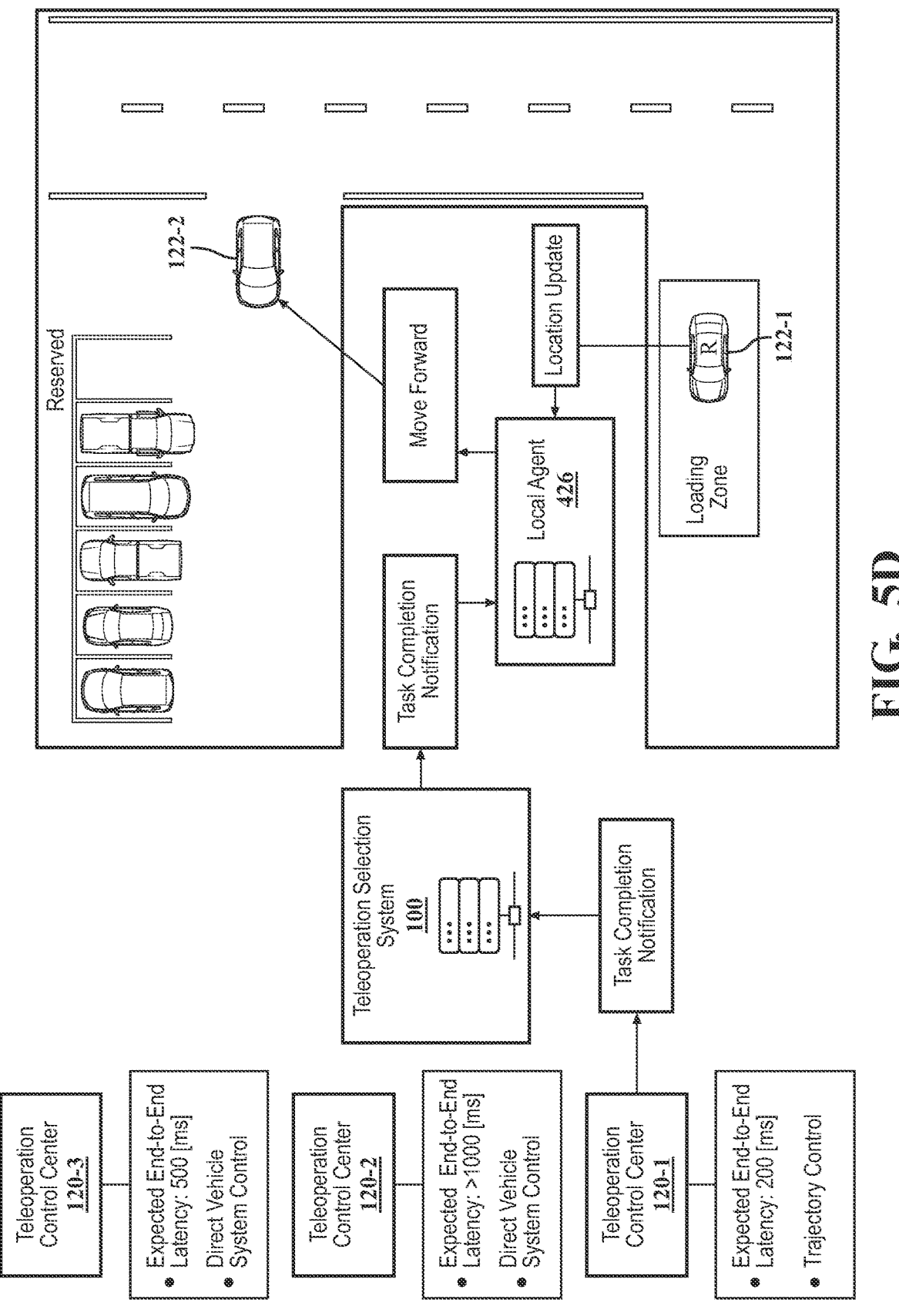

As depicted in FIG. 5D, the first teleoperation control center 120-1 finishes the maneuver and notifies the teleoperation selection system 100 of such. As such, the first teleoperation control center 120-1 may re-enter the pool of centers available for other subsequent teleoperated driving sessions. The local agent 426 receives the notification from the teleoperation selection system 100. The local agent 426 may then instruct the second vehicle 122-2 to move forward and let the first vehicle 122-1 owner know that it is ready for pick up in the loading zone.

Figure 6A:
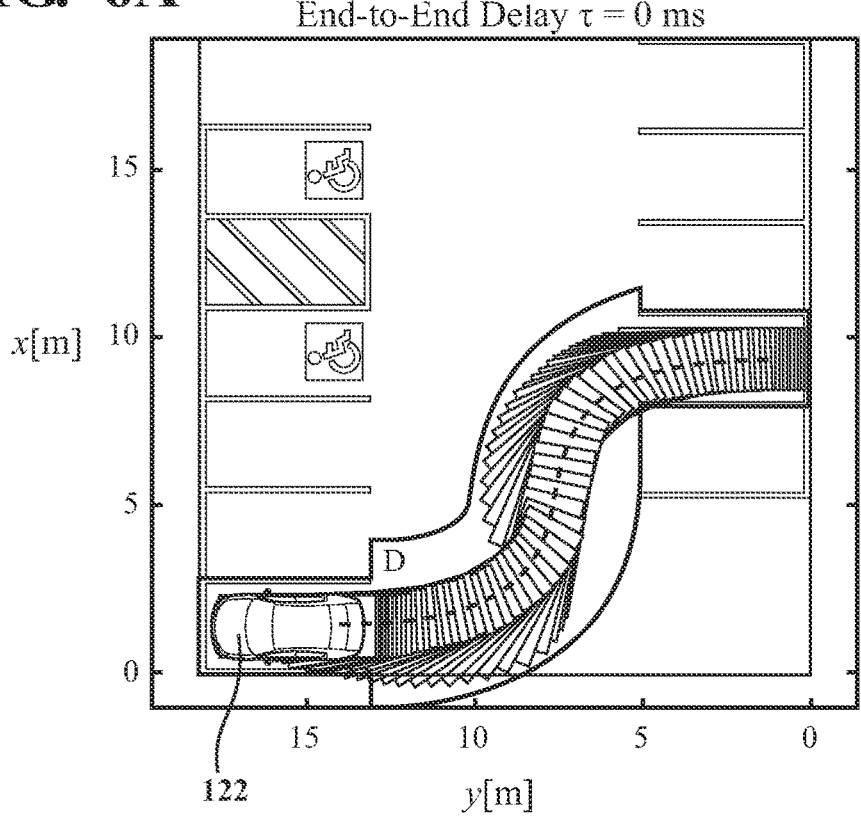
FIGS. 6A-6D depict the identification of computational parameters for a requested teleoperated driving session based on teleoperation session characteristics and a type of control.
Figure 6B:
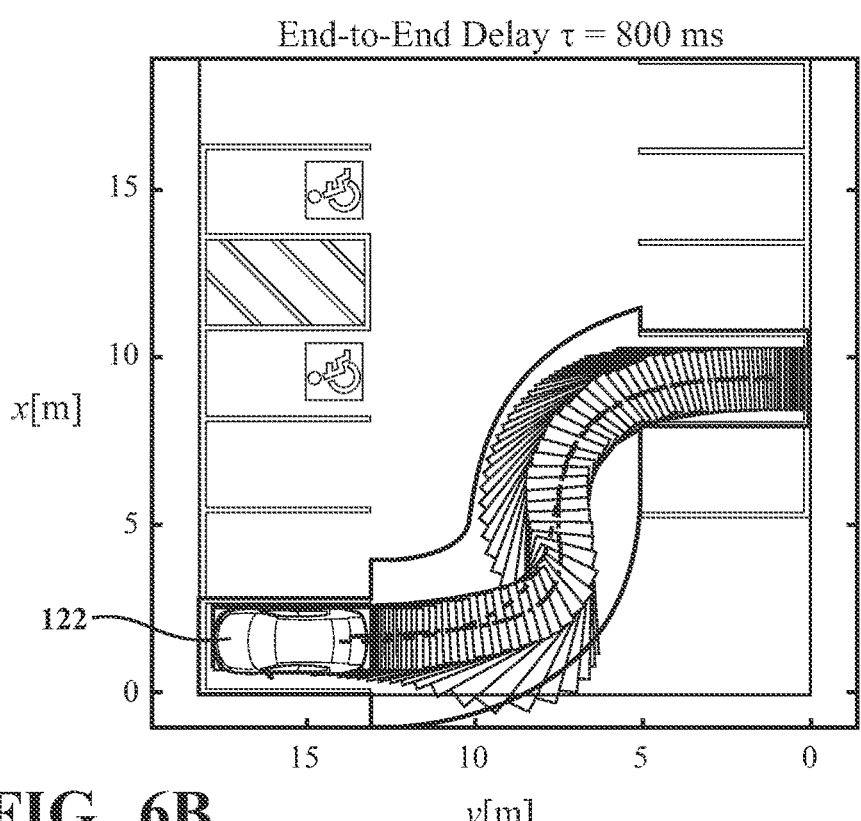
Figure 6C:
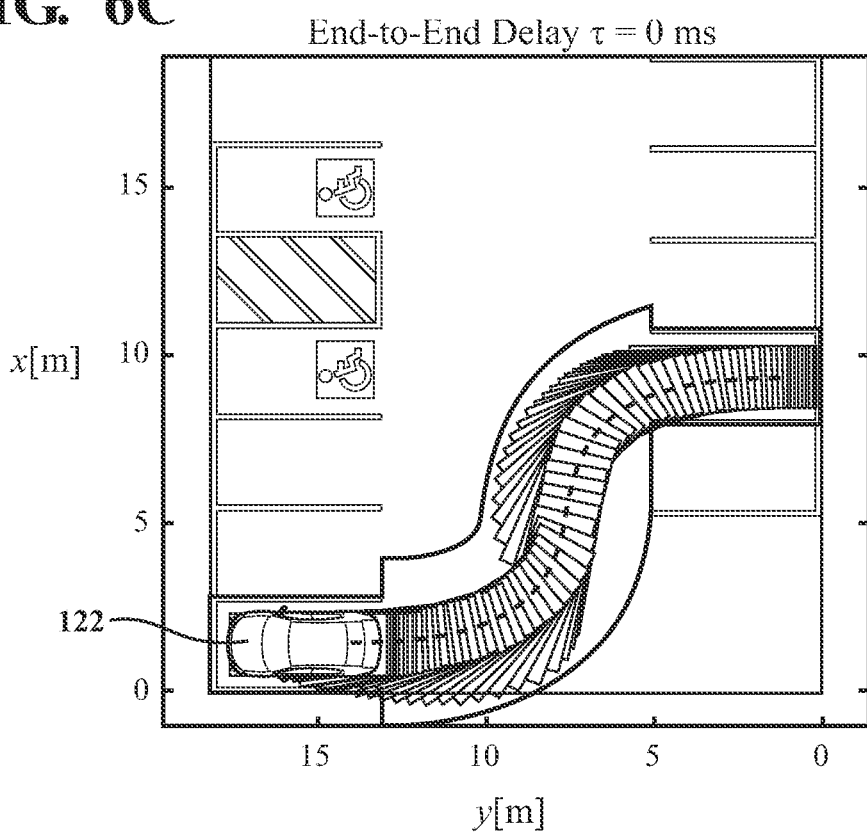
Figure 6D:
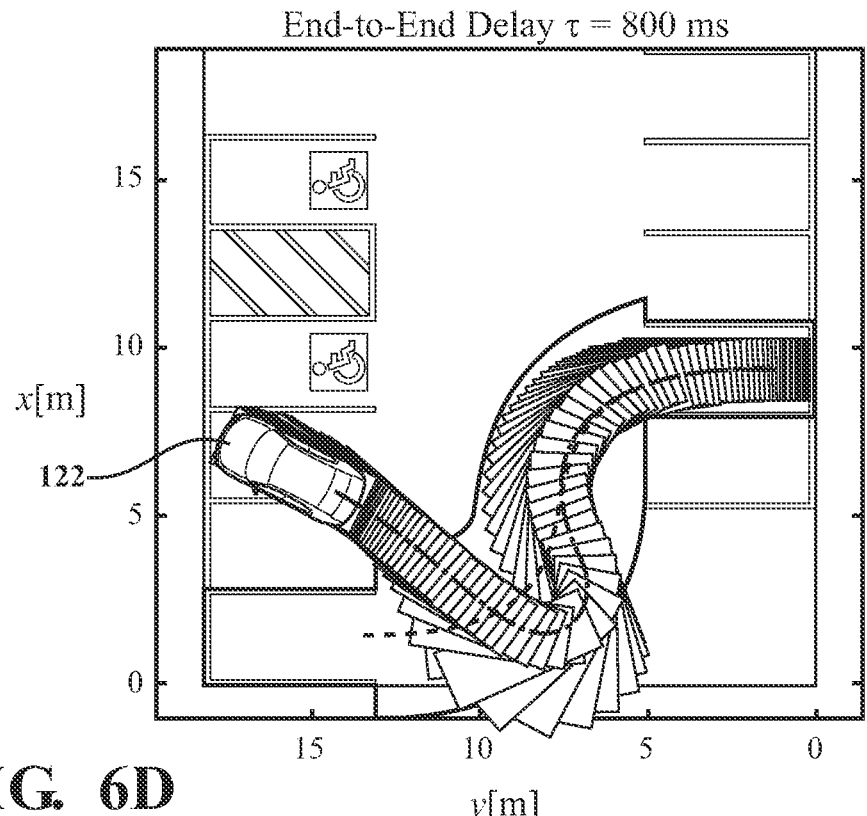

FIGS. 6A-6D depict the simulation of teleoperated driving maneuvers under various computational parameters. Specifically, FIGS. 6A and 6B depict the expected movement of a vehicle 122 from one parking spot to another, traveling at a speed of 1 m/s and FIGS. 6C and 6D depict the expected movement of the vehicle 122 from one parking spot to another while traveling at a speed of 2 m/s. Even more specifically, FIGS. 6A and 6C depict the effect of a 0 ms latency on vehicle movement, while FIGS. 6B and 6D depict the effect of an 800 ms latency on vehicle movement. FIG. 6D in particular indicates that for a maneuver characteristic with the depicted path curvature and a speed profile of 2 m/s, a latency of 800 ms will not lead to satisfactory or safe teleoperation of the vehicle 122. As such, based on this simulation, the selection module 114 may indicate a computational parameter (e.g., a latency parameter) of something less than 800 ms. By comparison, as depicted in FIG. 6B, for a maneuver characteristic with the depicted path curvature and a speed profile of 1 m/s, a latency of 800 ms may still result in a safe and satisfactory execution of the maneuver. As such, based on this simulation, the selection module 114 may indicate a computational parameter (e.g., a latency parameter) that allows for a latency of greater than 800 ms.

In other words, FIGS. 6A-6D depict how simulations of teleoperated driving sessions having particular session characteristics 104 lead to the identification of certain computational parameters for a teleoperated driving session. Note also that while FIGS. 6A-6D depict the simulation of a few session characteristics (e.g., speed profile and path curvature) and an output of a specific computational parameter (e.g., allowable latency), the selection module 114 may simulate different individual session characteristics and/or a different combination of session characteristics to output different computational parameters and/or different combinations of computational parameters.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6D, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. The systems, components, and/ or processes also can be embedded in a computer-readable storage, such as a computer program product or other data program storage device, readable by a machine, tangibly embodying a program of instructions executable by the machine to perform methods and processes described herein. These elements also can be embedded in an application product which comprises the features enabling the implementation of the methods described herein and which, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. A non-exhaustive list of the computer-readable storage medium can include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or a combination of the foregoing. In the context of this document, a computer-readable storage medium is, for example, a tangible medium that stores a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
a processor; and
a memory storing machine-readable instructions that, when executed by the processor, cause the processor to:
identify:
a control format for a requested teleoperated driving session; and
a computational parameter for the requested teleoperated driving session based on a session characteristic for the requested teleoperated driving session and the control format;
identify control capabilities of different teleoperation control centers; and
transmit control of a requesting vehicle to a target teleoperation control center of the different teleoperation control centers based on the computational parameter, the control format, and the control capabilities of the different teleoperation control centers.

2. The system of claim 1, wherein the machine-readable instruction that, when executed by the processor, causes the processor to identify the computational parameter for the requested teleoperated driving session based on the session characteristic comprises a machine-readable instruction that, when executed by the processor, causes the processor to identify the computational parameter for the requested teleoperated driving session based on at least one of a maneuver characteristic, a vehicle characteristic, or an environment characteristic.

3. The system of claim 1, wherein:
the machine-readable instruction that, when executed by the processor, causes the processor to identify the computational parameter for the requested teleoperated driving session comprises a machine-readable instruction that, when executed by the processor, causes the processor to identify at least one of a network parameter or a remote operation parameter; and
the machine-readable instruction that, when executed by the processor, causes the processor to identify the control capabilities of the different teleoperation control centers comprises a machine-readable instruction that, when executed by the processor, causes the processor to identify at least one of a network characteristic or a remote operation characteristic of the different teleoperation control centers.

4. The system of claim 1, wherein the machine-readable instruction that, when executed by the processor, causes the processor to identify the control format for the requested teleoperated driving session comprises a machine-readable instruction that, when executed by the processor, causes the processor to identify the control format as a trajectory control or a direct vehicle system control.

5. The system of claim 1, wherein the machine-readable instructions further comprise machine-readable instructions that, when executed by the processor, cause the processor to:
sequentially transmit a control request to the different teleoperation control centers; and
select as the target teleoperation control center, a teleoperation control center that indicates control capability alignment with the computational parameter.

6. The system of claim 1, wherein the machine-readable instructions further comprise machine-readable instructions that, when executed by the processor, cause the processor to:
compare the control capabilities of the different teleoperation control centers with the computational parameter; and
select as the target teleoperation control center, a teleoperation control center with control capability that aligns with the computational parameter.

7. The system of claim 1, wherein the machine-readable instruction that, when executed by the processor, causes the processor to identify the computational parameter for the requested teleoperated driving session comprises a machine-readable instruction that, when executed by the processor, causes the processor to identify the computational parameter for the requested teleoperated driving session based on at least one of:
simulations of the requested teleoperated driving session, each simulation having different candidate computational parameters; or
historical computational parameters from historical teleoperated driving sessions that have a same session characteristic as the session characteristic of the requested teleoperated driving session.

8. The system of claim 1, wherein the machine-readable instruction that, when executed by the processor, causes the processor to identify the computational parameter for the requested teleoperated driving session based on the session characteristic comprises a machine-readable instruction that, when executed by the processor, causes the processor to identify a threshold latency for the requested teleoperated session based on the session characteristics and the control format.

9. A non-transitory machine-readable medium comprising instructions that, when executed by a processor, cause the processor to:

identify:

a control format for a requested teleoperated driving session; and a computational parameter for the requested teleoperated driving session based on a session characteristic for the requested teleoperated driving session and the control format;

identify control capabilities of different teleoperation control centers; and transmit control of a requesting vehicle to a target teleoperation control center of the different teleoperation control centers based on the computational parameter, the control format, and the control capabilities of the different teleoperation control centers.

10. The non-transitory machine-readable medium of claim 9, wherein the instruction that, when executed by the processor, causes the processor to identify the computational parameter for the requested teleoperated driving session based on the session characteristic comprises an instruction that, when executed by the processor, causes the processor to identify the computational parameter for the requested teleoperated driving session based on at least one of a maneuver characteristic, a vehicle characteristic, or an environment characteristic.

11. The non-transitory machine-readable medium of claim 9, wherein:

the instruction that, when executed by the processor, causes the processor to identify the computational parameter for the requested teleoperated driving session comprises an instruction that, when executed by the processor, causes the processor to identify at least one of a network parameter or a remote operation parameter; and the instruction that, when executed by the processor, causes the processor to identify control capabilities of the different teleoperation control centers comprises an instruction that, when executed by the processor, causes the processor to identify at least one of a network characteristic or a remote operation characteristic of the different teleoperation control centers.

12. The non-transitory machine-readable medium of claim 9, wherein the instruction that, when executed by the processor, causes the processor to identify the control format for the requested teleoperated driving session comprises an instruction that, when executed by the processor, causes the processor to identify the control format as a trajectory control or a direct vehicle system control.

13. The non-transitory machine-readable medium of claim 9, wherein the non-transitory machine-readable medium further comprises instructions that, when executed by the processor, cause the processor to:

sequentially transmit a control request to the different teleoperation control centers; and select as the target teleoperation control center, a teleoperation control center that indicates control capability alignment with the computational parameter.

14. The non-transitory machine-readable medium of claim 9, wherein the non-transitory machine-readable medium further comprises instructions that, when executed by the processor, cause the processor to:

compare the control capabilities of the different teleoperation control centers with the computational parameter; and select as the target teleoperation control center, a teleoperation control center with control capability that aligns with the computational parameter.

15. A method, comprising:

identifying:

a control format for a requested teleoperated driving session; and a computational parameter for the requested teleoperated driving session based on a session characteristic for the requested teleoperated driving session and the control format;

identifying control capabilities of different teleoperation control centers; and transmitting control of a requesting vehicle to a target teleoperation control center of the different teleoperation control centers based on the computational parameter, the control format, and the control capabilities of the different teleoperation control centers.

16. The method of claim 15, wherein identifying the computational parameter for the requested teleoperated driving session based on the session characteristic comprises identifying the computational parameter for the requested teleoperated driving session based on at least one of a maneuver characteristic, a vehicle characteristic, or an environment characteristic.

17. The method of claim 15, wherein:

identifying the computational parameter for the requested teleoperated driving session comprises identifying at least one of a network parameter or a remote operation parameter; and identifying control capabilities of the different teleoperation control centers comprises identifying at least one of a network characteristic or a remote operation characteristic of the different teleoperation control centers.

18. The method of claim 15, wherein identifying the control format for the requested teleoperated driving session comprises identifying the control format as a trajectory control or a direct vehicle system control.

19. The method of claim 15, further comprising:

sequentially transmitting a control request to the different teleoperation control centers; and selecting as the target teleoperation control center, a teleoperation control center that indicates control capability alignment with the computational parameter.

20. The method of claim 15, wherein identifying the computational parameter for the requested teleoperated driving session comprises identifying the computational parameter for the requested teleoperated driving session based on at least one of:

simulation of the requested teleoperated driving session, each simulation having different candidate computational parameters; or historical computational parameters from historical teleoperated driving sessions that have a same session characteristic as the session characteristic of the requested teleoperated driving session.

\* \* \* \* \*